United States Patent [19]
Kawasaki

[11] 3,962,612
[45] June 8, 1976

[54] CONTROL DEVICE FOR ELECTRIC VEHICLE

[75] Inventor: Toshikazu Kawasaki, Suita, Japan

[73] Assignee: Daihatsu Motor Co., Inc., Japan

[22] Filed: Oct. 8, 1974

[21] Appl. No.: 513,130

[30] Foreign Application Priority Data

| | | |
|---|---|---|
| Oct. 12, 1973 | Japan | 48-114966 |
| Oct. 12, 1973 | Japan | 48-114967 |
| Apr. 22, 1974 | Japan | 49-45656 |
| Apr. 22, 1974 | Japan | 49-45657 |
| Apr. 24, 1974 | Japan | 49-46790 |
| Apr. 24, 1974 | Japan | 49-46791 |
| June 22, 1974 | Japan | 49-71757 |
| June 22, 1974 | Japan | 49-71758 |
| June 22, 1974 | Japan | 49-71759 |
| Aug. 14, 1974 | Japan | 49-93591 |
| Apr. 24, 1974 | Japan | 49-47518[U] |
| Apr. 24, 1974 | Japan | 49-47519[U] |

[52] U.S. Cl. ............ 318/139; 318/338; 318/356
[51] Int. Cl.² .................................. H02P 7/14
[58] Field of Search ........... 318/139, 356, 338, 349

[56] References Cited
UNITED STATES PATENTS

| | | | |
|---|---|---|---|
| 3,628,621 | 12/1971 | Lee | 318/139 X |
| 3,716,768 | 2/1973 | Mason | 318/139 |
| 3,735,220 | 5/1973 | Renner et al. | 318/139 |
| 3,811,079 | 5/1974 | Tashiro et al. | 318/356 X |

Primary Examiner—Gene Z. Rubinson
Attorney, Agent, or Firm—Staas & Halsey

[57] ABSTRACT

A control device is disclosed for an electric car employing a DC shunt motor, the armature, of which, is connected to a storage battery through a first relay contact and two series resistors shunted by second and third relay contacts second and third relays are energized in turn depending upon a degree of depression of an accelerator pedal, so that an armature terminal voltage is controlled to a plurality of values which are dependent upon the degree of pedal depression, the shunt field coil is connected through a field current control circuit for continuously controlling the field current depending upon a degree of depression of the accelerator pedal. In a preferred embodiment transistors are connected in series with the relays such that transistors are controlled by threshold values of rotational speed of the armature and/or an armature current. Therefore, the energization of the relays and thus of the switching control of the armature terminal voltage is conditioned by an armature rotational speed and/or an armature current. In another preferred embodiment of the present invention, the abovementioned continuous control of the field current is conditioned by a threshold value of armature rotational speed and/or an armature current. In a further preferred embodiment, the abovementioned switching control of the armature voltage and the abovementioned continuous control of the field current are both conditioned by a threshold value of armature rotational speed and/or an armature current.

22 Claims, 18 Drawing Figures

CONTROL DEVICE FOR ELECTRIC VEHICLE

BACKGROUND OF THE INVENTION:

1. Field of the Invention;

The present invention relates to a control device for an electric vehicle. More specifically, the present invention relates to a control device for controlling a rotational speed of a DC shunt motor or a compound motor comprising a shunt field coil used to power an electric car.

2. Descrption of the Prior Art;

Either of a DC series motor and a DC shunt motor may be used to power an electric car. As to well known, the rotational speed of a DC series motor is proportional to a terminal voltage of the motor. Therefore, by way of a speed control device of an electric car using a DC series motor, a resistor switching control circuit or a thyristor chopper circuit is connected in series therewith, to control the motor terminal voltage. The series resistance value is controlled by the resistor switching control circuit or a conduction angle of an on/off control by the thyristor chopper is controlled by a speed control apparatus, such as an accelerator.

As far as the electric characteristic is concerned, a DC series motor is most suited for speed control. Nevertheless, a great problem encountered in an electric car using a series motor is that efficiency of the series motor is low as compared with a shunt motor. Generally speaking, efficiency of the shunt motor is about 10 to 15 per cent higher than that of the series motor. Thus, it is desired that a electric vehicle such as an electric car using a storage battery power source be driven by a shunt motor, rather than by a series motor.

Another problem encountered in an electric car using a DC series motor is that the abovementioned resistor switching control circuit is constructed in as many switching control stages as possible in order to make smooth variation of the speed, thereby resulting in a complicated structure. An electric car using a series motor is further disadvantageous in that when the electric car is controlled in a relatively low speed a resistor of a given value is connected in series with the motor, which, undesirably dissipates electric power and decreases the efficiency.

On the other hand, in an electric car using a series motor controlled by means of a thyristor chopper, the motor is energized by an on/off current or a ripple current. Therefore, the commutating characteristic of the motor becomes poor and is liable to cause a power loss. If a commutation reactor is used in order to avoid the abovementioned disadvantage, a power loss also results due to other causes such as iron loss or copper loss by the reactor. Another problem encountered in connection with an electric car using a series motor energized via a thyristor chopper is a turnoff failure. To provide for securing a turn-off operation of the chopper entails a problem of complicated circuitry and thus of a higher cost. Another great problem encountered in connection with an electric car using a series motor energized via a thyristor is that components used in the chopper make undesired noise, which is often large and causing discomfort to a driver of the car. More specifically, when a thyristor chopper is operated to turn on and off the direct current by means of a thyristor as a switching device, various components vibrate due to electrical oscillation generated in the chopper, and make a noise, often large enough to make driver feel uncomfortable.

Most disadvantages described hereinabove will be eliminated by employment of a shunt motor in an electric car. The largest advantage in employing a shunt motor in an electric car is that power consumption of a shunt motor is much less as compared to a series motor, such an advantage is very desirable in an electric car using a storage battery as a power source. Nevertheless, as is well known, speed control of a shunt motor is relatively difficult. One approach for speed control of a shunt motor is to change a current flowing through a shunt field coil by means of a speed control device. As is well known, with a shunt motor the smaller the field current is, the higher the rotational speed of the armature becomes. However, this approach merely provides a very narrow speed controllable range, and therefore cannot cover so wide a controllable range as to meet the requirement of an electric car.

Another approach for speed control of a shunt motor is to control the terminal voltage at the armature. Just as in case of a series motor, a rotational speed of the shunt motor is proportional to the armature terminal voltage, although in the shunt motor the maximum speed thereof is determined by the field current. Therefore, the approach for control of the terminal voltage described in connection with speed control of a series motor may be employed for the purpose of speed control of a shunt motor. However, even in the case of controlling the armature terminal voltage of a shunt motor, the same problems as encountered in control of the terminal voltage of the series motor will be again encountered. Thus, an improved speed control device is desired for use in a DC motor comprising a shunt field coil, such as a shunt motor, which is of high efficiency, of simplicity in structure, and creates little noise.

Typically, a resistor switching control circuit is also used for the purpose of controlling the armature terminal voltage of the shunt motor. The resistor switching control circuit comprises one or more series resistor connected between a power supply and a shunt motor. The resistors are shunted or short circuited by a relay operable in a ganged fashion with an accelerator pedal so that depression of the accelerator pedal to a certain degree causes the relay to be activated and thereby shunting the series resistor to increase the armature terminal voltage and thus to increase the motor speed to a value as determined by the current fed to the field coil thereof. Therefore, assuming that a driver of an electric car employing such a resistor-switched shunt motor depresses abruptly an accelerator pedal to a maximum degree from an initial position at the time of starting the car, an armature is supplied with a power through a minimum value of series resistance and thus an armature current tends to reach immediately a value for a maximum speed of the motor. As a result steering stability of the car decreases and both the motor and a control system therefor are adversely affected. Thus, an improved speed control device is desired for use in a DC motor having a shunt field coil, such as a shunt motor, which allows for stable of steering of the car.

If an electric car employs a shunt motor, which is selectively adapted to drive the car upon energization thereof by way of an ordinary driving mode it will generate a power to the power supply by way of a regenerative braking mode. When the car is running and the accelerator pedal is released armature is rotated due to inertia of the running car and a regenerative power is generated to charge a storage battery of the power supply. Assuming that the field coil current is constant or is not varied, the higher the rotational speed of the armature the higher the generated voltage and thus the greater the regeneration to the battery. Therefore, if the accelerator pedal is released abruptly while the car is running in a high speed, the regenerative braking is abruptly effective and a very dangerous situation results. At the same time a large current flows through the armature and adversely affects the motor.

Therefore, it is a primary object of the present invention to provide a speed control device for an electric vehicle using a DC motor, comprising a shunt field coil, such as a shunt motor or a compound motor, such DC motors are characterized by high efficiency, have a simple structure, are less expensive, and generate little noise.

It is another object of the present invention to provide a speed control device for an electric vehicle using a DC motor comprising a shunt field coil, which stabilizes the steering of the vehicle.

It is a further object of the present invention to provide a speed control device for an electric vehicle using a DC motor comprising shunt field coil, in which a proper regenerative braking is obtained irrespective of a rotational speed or an armature current.

Other objects, features and advantages of the present invention will be better understood from the following detailed description of the present invention when taken in conjunction with the accompanying drawings.

SUMMARY OF THE INVENTION

Basically, the present invention comprises an electric vehicle employing a DC motor comprising a shunt field coil, such as a shunt motor or a compound motor, an armature of which is connected to a DC power supply through an armature terminal voltage switching control circuit, switching of the armature terminal voltage is controlled to a plurality of levels depending upon a degree of adjustment of a speed adjusting device such as an accelerator pedal. The shunt coil is connected through a field current control circuit for continuously controlling the field current depending upon a degree of adjustment of the speed adjusting device.

In a preferred embodiment of the present invention, the abovementioned switching control of the armature terminal voltage is conditioned by a threshold valve of rotational speed of the armature and/or the armature current.

In another preferred embodiment of the present invention, the abovementioned continuous control of the field current is conditioned by a rotational speed of the armature and/or the armature current.

In a further preferred embodiment of the present invention, the abovementioned switching control of the armature voltage and the abovementioned continuous control of the field current are each conditioned by a rotational speed of the armature and/or an armature current.

Figure 1:
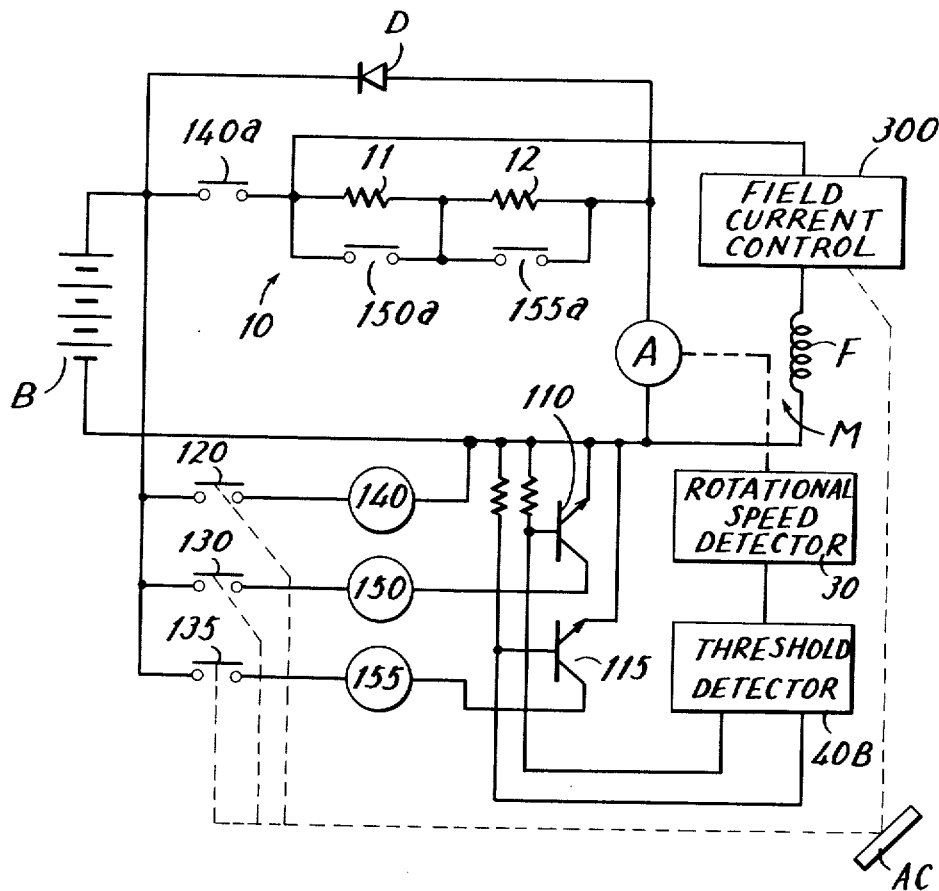
FIG. 1 illustrates a schematic diagram of a first embodiment of the present invention.

DESCRIPTION OF THE PREFERRED EMBODIMENTS:

FIG. 1 illustrates a schematic diagram of an embodiment of the present invention. The embodiment shown comprises a series connection of a storage battery B, resistors 11 and 12 and an armature A of a DC shunt motor M, a relay contact 140a being interposed between the battery B and the resistors 11 and 12 and relay contacts 150a and 155a being connected in parallel with the resistors 11 and 12, respectively. The FIG.

1 embodiment shows another series connection of the battery B, the relay contact 140a, a field current control circuit 300 for control of the current flowing through a field coil F of the motor M, (to be more fully described subsequently), and the field coil F. The control circuit 300 and relays 140, 150 and 155 for the abovementioned relay contacts 140a, 150a and 155a, respectively, are connected so as to be cooperative with a speed adjusting device AC such as an accelerator pedal has a range of positions and is continuously adjustable from a start position to positions throughout its range.

The relay contacts 140a, 150a and 155a are adapted to be closed upon energization of the relays 140, 150 and 155, respectively. The relays 140, 150 and 155 are respectively connected in series with accelerator switches 120, 130 and 135, which are individually ganged with the accelerator pedal AC a slight depression of the pedal AC closes the accelerator switch 120 a, medium depression of the accelerator pedal AC closes the accelerator switch 130. And a deep depression of the accelerator pedal AC closes the accelerator switch 135. When each of the accelerator switches 120, 130 and 135 are closed, the corresponding relays 140, 150 and 155 are energized and the corresponding relay contacts 140a, 150a and 155a are closed.

In a preferred embodiment of the present invention, the other ends of the relays 150 and 155 are connected to the collectors of the transistors 110 and 115, respectively. The transistors 110 and 115 are each adapted to be turned on by outputs of predetermined different threshold values from a threshold detector 40B for detecting at the said different threshold values an output from a rotational speed detector 30 which detects the rotational speed of the armature A. More specifically, a first and second outputs from the threshold detector 40B are respectively connected to bases of the transistors 110 and 115, and the, emitters of which are grounded. Therefore, transistors 110 and 115 are turned off, when a rotational speed of the motor is less than a predetermined speed. When transistor 110 and 115 are turned off, relays 150 and 155 are not energized, even though the accelerator switches 130 and 135 are closed due to depression of the accelerator pedal AC, the relay contacts 150a and 155a are not closed. In other words, in the abovementioned preferred embodiment of the present invention, despite abrupt depression of the accelerator pedal AC, switching control of the armature terminal voltage is disabled, insofar as the rotational speed of the motor M is relatively low.

A detailed description of the operation will be discussed with reference to FIG. 1. At the start of the electric car, the accelerator pedal AC is lightly depressed and accordingly the accelerator switch 120 is closed, so that the relay 140 is energized and the relay contact 140a is closed. Therefore, a connection from the battery B through the resistors 11 and 12 to the armature A is formed, so that the motor M comes to rotate in a given rotational speed within a certain period of time. When the accelerator pedal AC is further depressed, the accelerator switches 130 and 135 are accordingly, and in turn, closed. Assuming that the motor M has reached a certain medium speed, then in the preferred embodiment transistors 110 and 115 have been turned on and accordingly the relays 150 and 155 have been energized, so that smooth changing of the speed to the second and third stages can be performed. In the event the accelerator pedal AC is depressed so much as to close the accelerator switches 130 and 135 while the motor M has not reached the abovementioned threshold rotational speed, the transistors 110 and 115 are still nonconductive, so that the relays 150 and 155 are not energized and switching control of the speed to the second and third stages is disabled.

Figure 2:
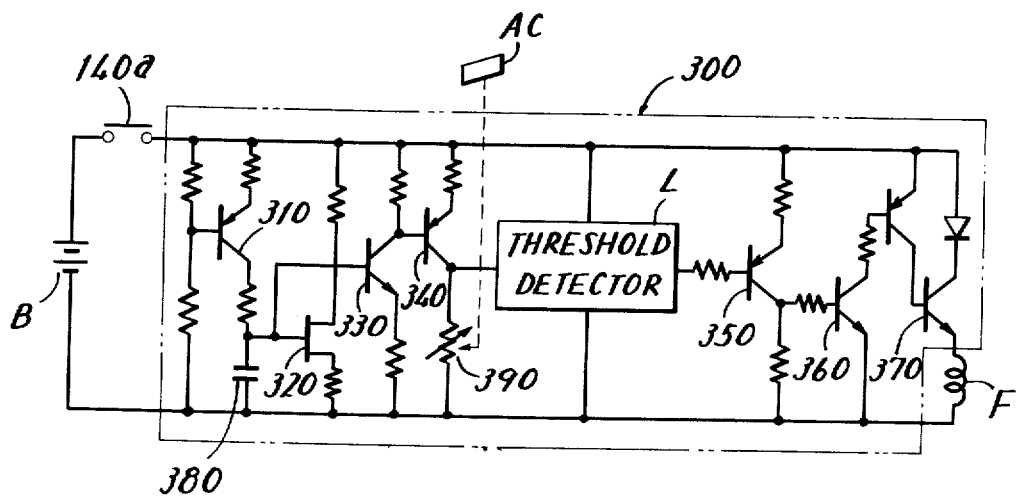
FIG. 2 illustrates a detailed schematic diagram of the field current control circuit 300 for controlling the valve of current flowing through the field coil, F as shown in FIG. 1, by means of a speed control device AC, such as an accelerator pedal.

FIG. 2 illustrates a detailed schematic diagram of the field current control circuit 300 for controlling the value of a current flowing through the field coil F shown in FIG. 1 by means of a speed adjusting device AC such as an accelerator pedal. Circuit connection and operation will be described in the following. Upon slight depression of the accelerator pedal AC the relay contact 140a is closed, so that the control circuit 300 is energized. Accordingly a transistor 310 and a unijunction transistor 320 are placed in a conductive condition, so that the circuit concerned makes oscillation at a predetermined frequency in a well known manner and an oscillatory output of saw tooth wave form is amplified by the transistors 330 and 340 in the subsequent stages. A noteworthy feature of the circuit is that a variable resistor 390 is connected to the collector of the transistor 340, which is ganged with the accelerator pedal AC, so that resistance thereacross is continuously changeable as a function of a degree of depression of the accelerator pedal AC. Accordingly, an output level or amplification degree of the transistor 340 and thus the gradient of the saw tooth wave form are changeable as a function of the degree of depression of the accelerator pedal AC. The abovementioned output is threshold detected by a threshold detector L, so that an output of a pulse shape or a rectangle shape is fed to the base of a transistor 350. It is understood that the abovementioned pulse shaped output changes it pulse width in accordance with the degree of depression of the accelerator pedal AC. The pulse shaped output from the detector L is amplified by the transistors 350, 360 and 370. It is important that the control circuit 300 is so designed that the more the accelerator pedal AC is depressed the less the pulse width at the output from the transistor 370. Accordingly, the more the pedal AC is depressed the less field currrent flows through the field coil F, and vice versa.

It has been desired from the market that upon releasing of the depressed accelerator pedal AC in an electric car regenerative braking becomes operative. To achieve such braking in an electric car using a shunt motor, a proper value of current is often fed to the field coil F so as to regenerate a power to the battery B upon releasing of the depressed accelerator pedal AC. Referring again to the FIG. 1 circuit diagram for an electric car, it is apparent that upon releasing of the accelerator pedal AC, from a fully depressed position, the current flowing through the field coil F increases. An abrupt change of the field current naturally causes a voltage to be generated across the armature A due to a difference of the current flowing through the field coil F. If the voltage generated across the armature A is higher than the terminal voltage of the battery B, regeneration of the power is possible. It is to be pointed out that in the embodiment of the FIG. 1 diagram a diode D is connected from the armature A to the battery B in this direction for the purpose of power regeneration. According to the FIG. 1 diagram, when the relay contact 140a is opened in a power regenerative mode, only a voltage commensurate with a voltage drop across the diode D is cut off, which is very low, so that no arc occurs and no contact is degraded.

Figure 3:
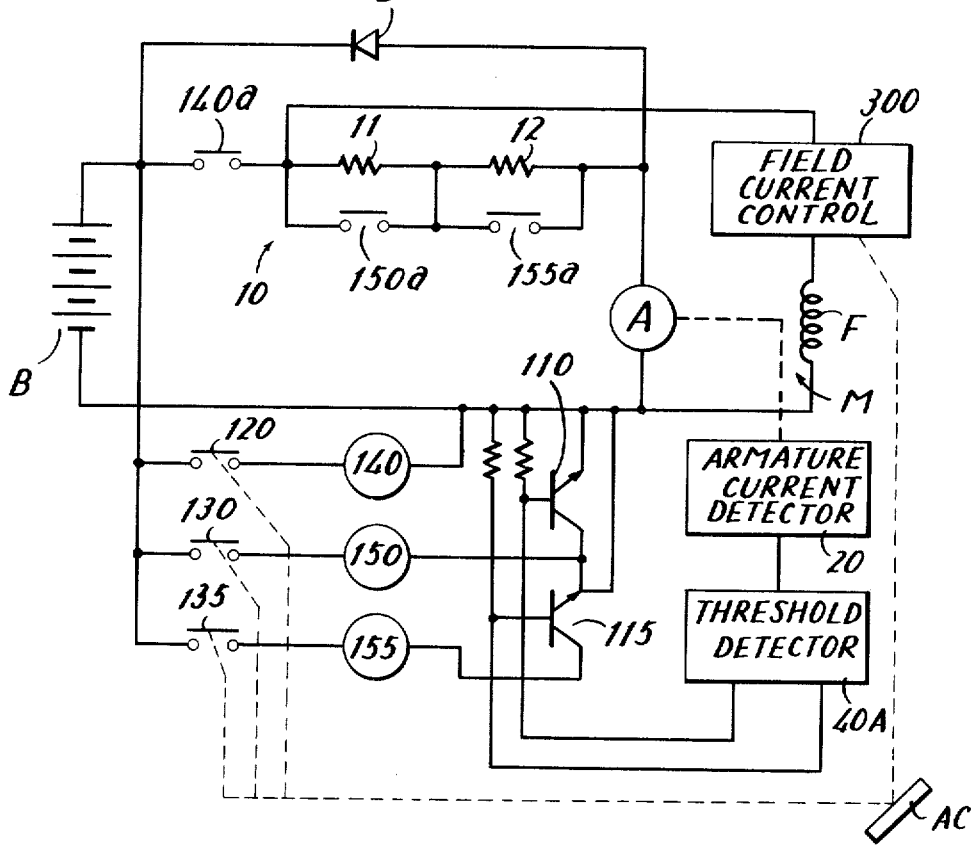
FIG. 3 illustrates a schematic diagram of a second embodiment of the present invention wherein an armature current detector is employed.

FIG. 3 is similar to FIG. 1 but illustrates a schematic diagram of another embodiment of the present invention. In the FIG. 3 embodiment, an armature current detector 20 is employed in lieu of the armature rotational speed detector 30. In view of the fact that the rotational speed of the armature A is inversely proportional to the armature current, the threshold detector 40A is adapted to comprise an inverter for inverting an output from the detector 20. The armature current detector 20 may comprise a small resistor interposed in series with the armature A for measuring the armature current in terms of a voltage drop across the resistor, in a known manner. Thus, it is understood that in the embodiment shown substantially the same result as the FIG. 1 embodiment will be obtained.

Figure 4A:
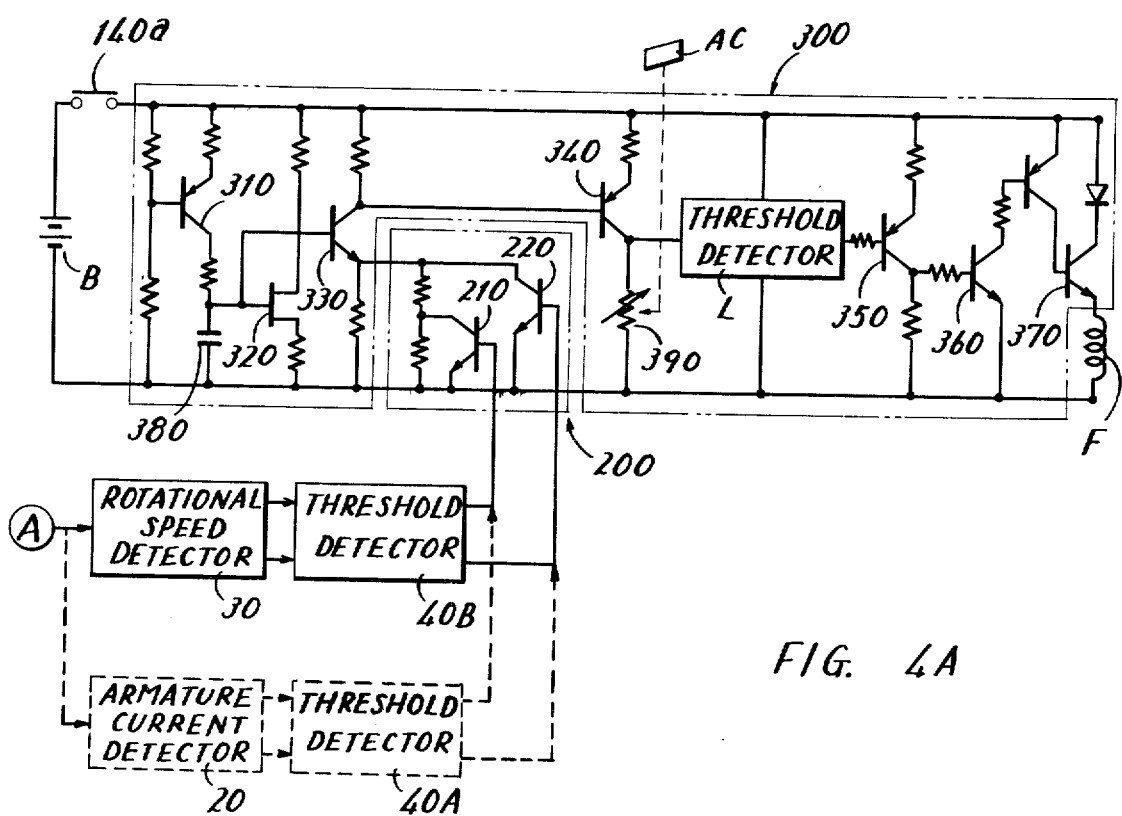
FIG. 4A illustrates a detailed schematic diagram of a second embodiment of the field current control circuit of the present invention with a two stage gain control.

FIG. 4A is similar to FIG. 2 but illustrates a detailed schematic diagram of a field current control circuit of another embodiment of the present invention. An essential feature of the embodiment shown, is to control, in different stages, sensitivity of the field control circuit 300 in response to different threshold values of an armature rotational speed or an armature current. In comparison of the FIG. 4A embodiment with the FIG. 2 embodiment, the FIG. 4A embodiment comprises a two staged gain control circuit 200 connected in parallel with an emitter bias resistor of the transistor 340 for control of a bias thereof and thus a control gain thereof in response to an armature speed or an armature current, and a threshold detector 40B or 40A for providing outputs of different threshold values in response to an output from an armature rotational speed detector 30 or an armature current detector 20, respectively. It is pointed out that for simplicity of illustration the detectors 40B and 30 are shown in solid lines, while the detectors 40A and 20 are shown in dotted lines in a phantom manner by way of an alternative connection. Other portions are substantially the same as those in the FIG. 2 embodiment and therefore the same or like portions are designated by the same reference characters. The gain control circuit 200 comprises series connected resistors connected to shunt the emitter bias resistor of the transistor 340 and transistors 210 and 220, each connected to ground a higher potential terminal of each of the abovementioned series connected resistors, respectively.

Now operation of the FIG. 4A embodiment will be described as comprising only the detectors 40B and 30, as shown in solid lines. It is pointed out that alternative connection of the detectors 40A and 20, as shown in dotted lines, can be understood in substantially the same manner. As mentioned briefly, an objective of the FIG. 4A embodiment is to limit a change in the field coil current, irrespective of depression of the accelerator pedal when the armature rotational speed is low and the mature current is high. The field coil current is automatically allowed to become dependent on the degree of depression of the accelerator pedal AC when the armature rotational speed increases thereby decreasing the armature current. It is understood that selective conduction of either transistor 210 or 220 in response to an output from the detector 40B changes an emitter bias of the transistor 340 and thus the degree of amplification of the transistor 340. Control of the degree of amplification of the transistor 330 is so chosen that the higher the armature rotational speed, the less the pulse width in the transistor 370 and the less average field coil current.

Thus, it will be understood that the detector 40B and transistors 210 and 220 limit a speed variable range controllable by means of an accelerator pedal AC. Therefore, the variable range of the field coil current by depression of the accelerator pedal AC corresponding to the armature rotational speed can be limited as in the following: by way of an example of a desired condition for design, i.e. the field coil current may be set at 9.5 – 10A at a low armature speed, at 5 – 10A at a medium speed and at 2 – 10A at a high speed, respectively.

Figure 4B:
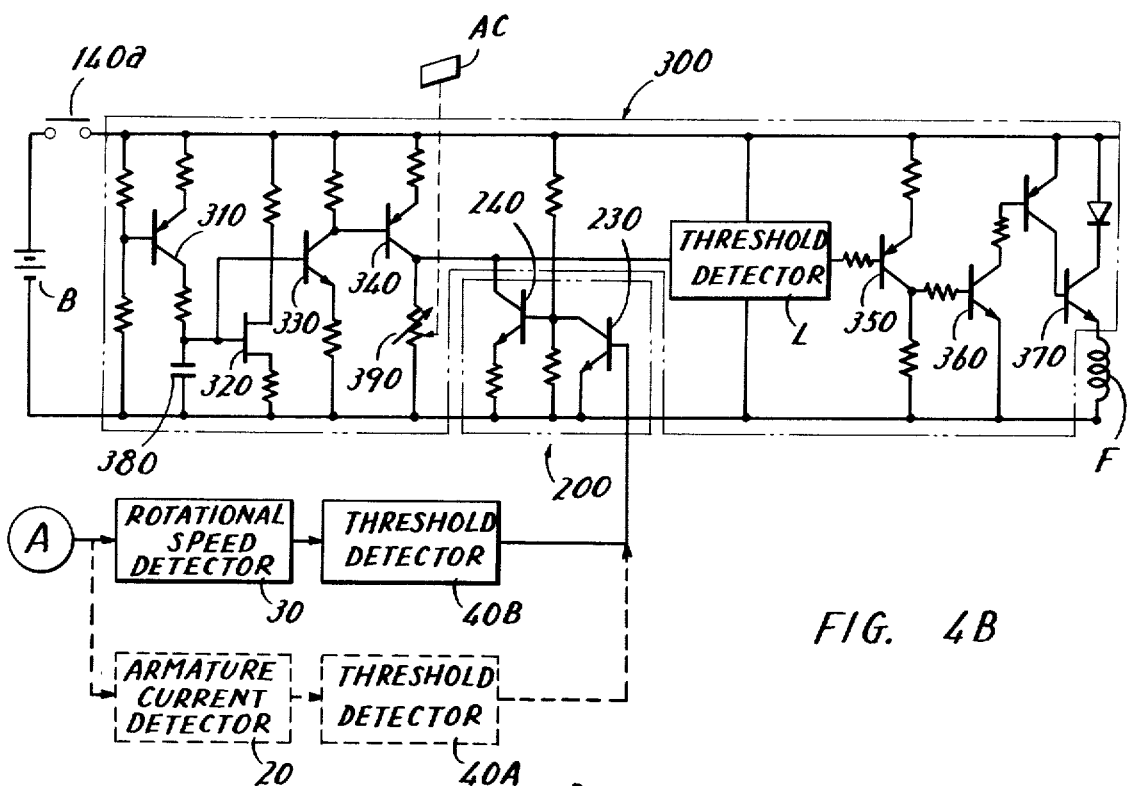
FIG. 4B shows a modification of the field current control circuit embodiment shown in FIG. 4A.

FIG. 4B is a modified embodiment of the FIG. 4A embodiment. A modified portion in FIG. 4B is that the gain control means 200 is connected to a collector of the transistor 340 of the control circuit 300. Other portions thereof are the same as those in FIG. 4A and therefore the same or like portions are designated by the same reference characters. It is pointed out that for the same reason described in connection with FIG. 4A the FIG. 4B illustration shows the blocks 30 and 40B in solid lines and the blocks 20 and 40A in dotted lines. The gain control means 200 comprises a transistor 230 which inverts polarity of an output from the detector 40B received at the base thereof and a transistor 240 receiving at the base thereof an output from the transistor 230. A collector of the transistor 230 is connected to the base of the transistor 240, which base is grounded through a resistor. A collector of the transistor 240 is connected to a collector of the transistor 340. Thus, it will be understood that transistors 230 and 240 constitute a variable impedance means provided associated with the variable resistor 390 controllable in a ganged fashion with the accelerator pedal AC. Thus, the transistor 240 is provided at the base thereof with an output, as threshold detected, of the armature rotational speed through the transistor 230 for polarity inversion, so that sensitivity of control by means of an accelerator pedal AC or efficiency of the accelerator is changed according to the rotational speed of a motor. As a result, even if the accelerator pedal AC is fully depressed to the end of its range, the current flowing through the field coil F is not greatly changed when the rotational speed of the motor is comparatively low, whereas a variable range of the current flowing through the field coil F is made larger as the rotational speed becomes high. Accordingly, when the rotational speed is high, the control width of the field coil becomes large.

Figure 5:
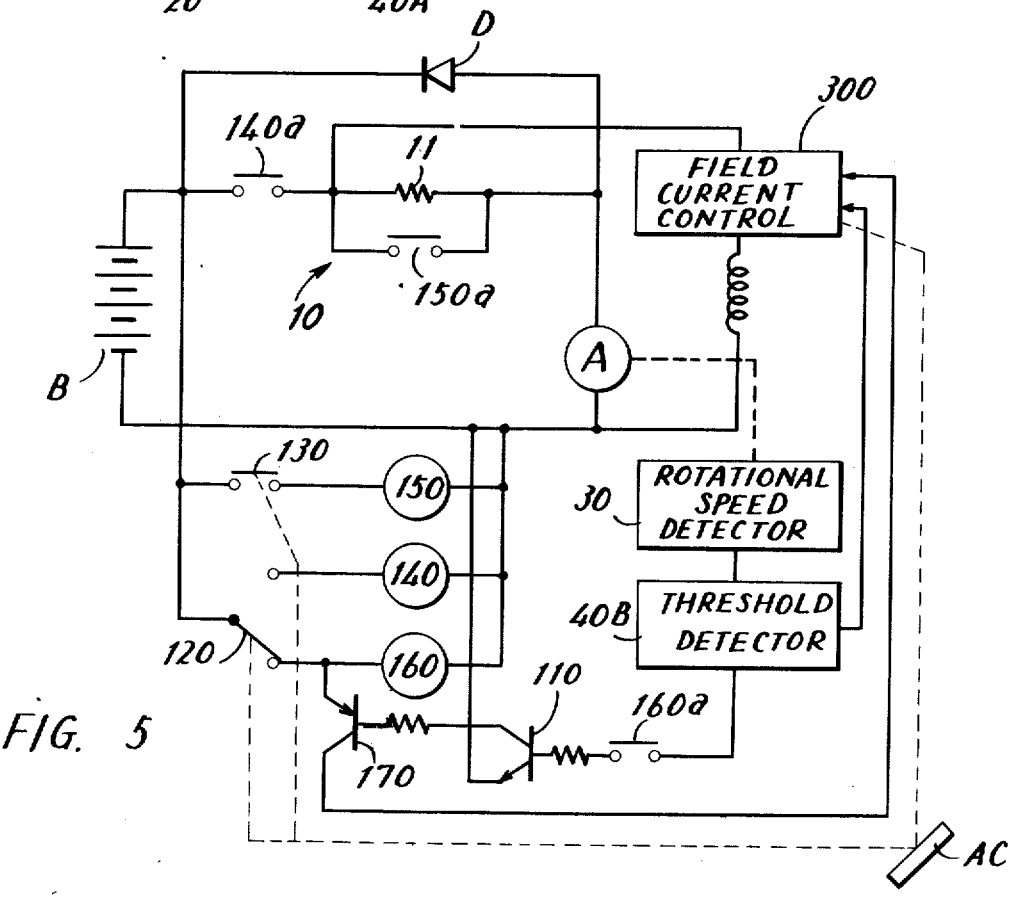
FIG. 5 shows a detailed schematic diagram of a further embodiment of the present invention, which is similar to FIG. 1 but provides a regenerative current control.
Figure 6A:
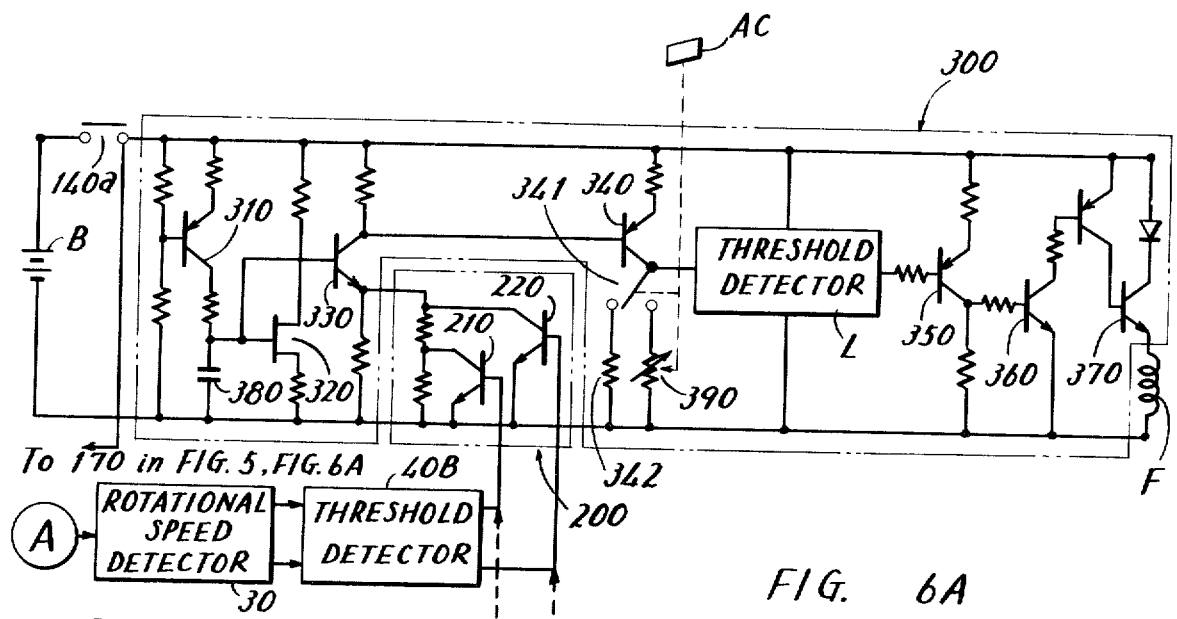
FIG. 6A shows a detailed circuit diagram of the field current control circuit as shown in FIG. 5.

FIGS. 5 and 6A show a detailed schematic diagram of a further embodiment of the present invention, which are similar to FIGS. 1 and 4A and 4B, respectively. Therefore, the same or like portions are designated by the same reference characters. It is pointed out that for the same reason described in connection with FIGS. 4A and 4B the FIG. 6A illustration shows the blocks 30 and 40B in solid lines and the blocks SH, EX, 20 and 40A in dotted lines, the latter being described subsequently in conjunction with the FIG. 6B embodiment. As previously described, in the case where the accelerator pedal is released abruptly while the speed of an electric vehicle is high, a very dangerous condition is presented because of abrupt regenerative control thereby. For the purpose of preventing such a dangerous situation, therefore, the embodiment shown is adapted to apply current to the field coil F according to the armature rotational speed, as the accelerator pedal AC is released, so that a proper regenerative power is generated by the motor M.

A major portion of FIGS. 5 and 6A are similar to that of FIGS. 1 and 4A and 4B, so that only the difference therebetween will be described specifically. Referring to FIG. 5, there are provided the rotational speed detector 30 coupled to the motor M and the threshold detector 40B for threshold detecting an output from the detector 30 at a predetermined threshold value. The output of the detector 40B controls transistors 110 and 170 on or off through a relay contact 160a. More specifically, the output from the detector 40B is coupled through the relay contact 160a to a base of a transistor 110, an emitter of which is grounded and a collector of which is coupled to a base of the subsequent transistor 170 connected via an accelerator switch 120 to the power supply B which energizes the relay 140 or 160 through the accelerator switch 120. The collector of the transistor 170 is coupled to the control circuit 300 at the output side of the relay contact 140a, as shown in FIG. 6A. The accelerator switch 120 is adapted to be connected to the side of the relay 160 as shown when the accelerator pedal AC is not depressed. Accordingly, when the accelerator pedal AC is not depressed and the motor M is rotating at a predetermined rotational speed, the transistors 110 and 170 become conductive and the control circuit 300 is kept supplied with power or energized through the transistor 170 and thus the field coil F is kept supplied with a field current, whereby the abovementioned dangerous condition is avoided.

Referring to FIG. 5, a more detailed description as to operation will be given in the following. At the start, the accelerator pedal is depressed lightly, and the accelerator switch 120 is turned to the side of relay 140, so that the relay 140 is energized and the relay contact 140a is closed. Thereby, a path of battery B-resistor 11-armature A is formed. Thereafter, as the accelerator pedal AC is further depressed, the accelerator switch 130 is also closed and the motor M rotates at a higher speed.

Now, let it be assumed that the accelerator pedal AC is released abruptly. Accordingly, the accelerator switch 130 is opened, and the accelerator switch 120 is turned to the side of the relay 160 so that the relay 160 is energized. As a result, the relay contact 160a is closed. Therefore, the transistors 110 and 170 become conductive depending upon the armature rotational speed of the motor M at that time and the control circuit 300 is energized by the power supply B and thus a controlled current is applied to the field coil F. On the other hand, upon deenergization of the relays 140 and 150, the relay contacts 140a and 150a are opened and a regenerative circuit of armature A-diode D-battery B is formed so that a regenerative mode is performed.

Figure 6B:
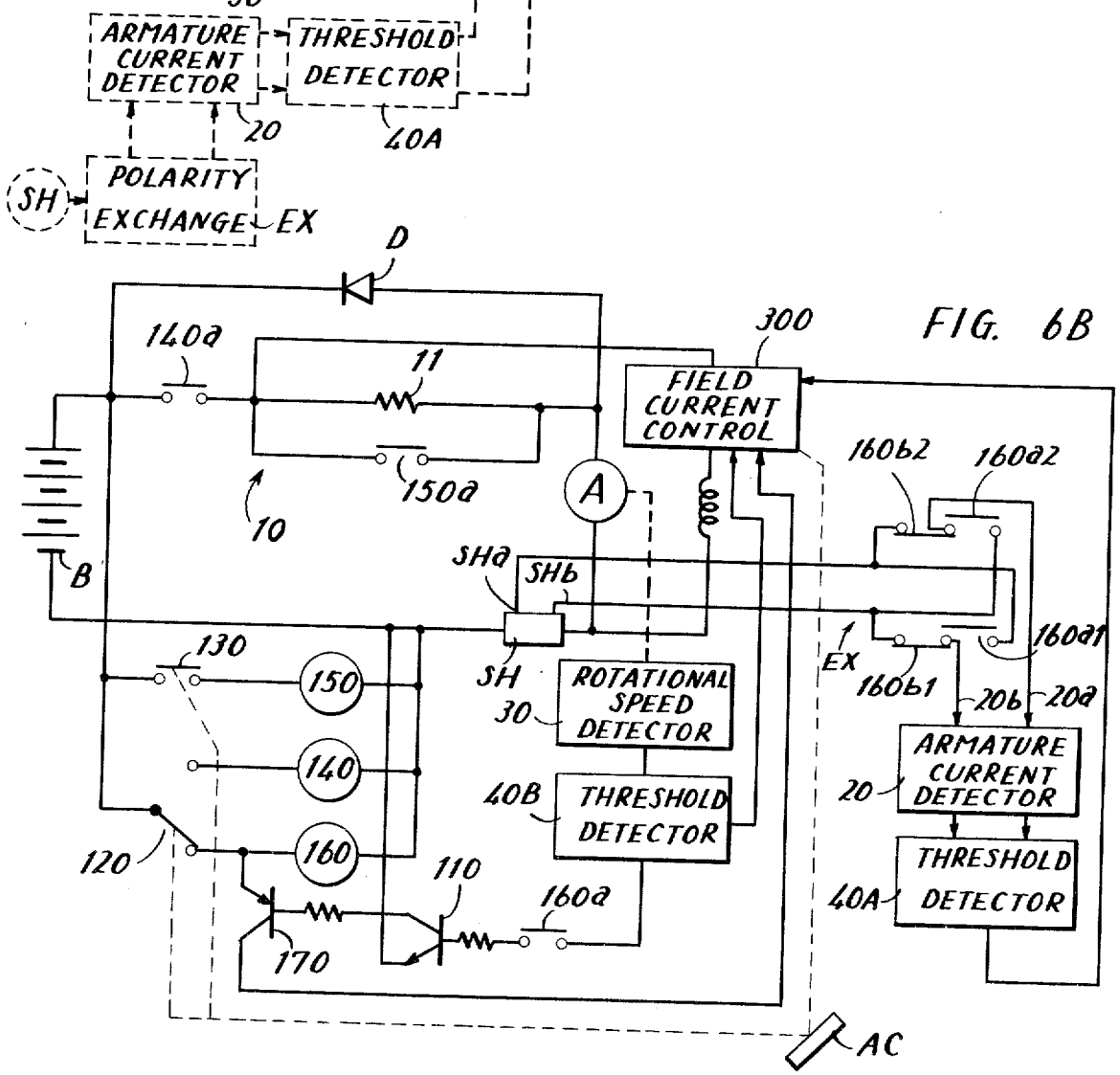
FIG. 6B illustrates a schematic diagram of a further embodiment of the present invention modified from the embodiment shown in FIG. 5 using a field current control circuit as shown in FIG. 6A.

FIG. 6B is similar to FIG. 5 but illustrates a schematic diagram of a further embodiment of the present invention modified from the FIG. 5 embodiment, which is combined with the FIG. 6A circuit as modified to comprise an alternative connection of the blocks SH, EX, 20 and 40A, as shown in dotted lines. Referring to FIG. 6B, a shunt resistor SH, a polarity inversion circuit EX, a current detecting means 20 and a threshold detector 40A are provided in addition to the circuit shown in FIG. 5. The shunt resistor SH is connected, as shown, in series with the battery B and the armature A. When the accelerator pedal AC is depressed, a current flows from the battery B through the armature voltage switching control circuit 10, the armature A and the shunt resistor SH back to the battery B. However, when the accelerator pedal AC is released, the regenerative braking mode is performed and a current flows through the armature A and the switching circuit 10 to the battery B, so that polarity of the current taken from the shunt resistor SH is reversed as compared with the driving mode. Accordingly, the polarity exchange circuit EX is inserted between the shunt resistor SH and the flowing current detecting means 20 for inversion of the polarity of the detected output. The polarity exchange circuit EX comprises a pair of normally closed contacts 160b1 and 160b2 and a pair of normally opened contacts 160a1 and 160a2, associated with the relay 160, which are connected as shown. In the event the accelerator pedal AC is depressed, the normally closed contacts 160b1 and 160b2 are opened and the normally opened contacts 160a1 and 160a2 are closed, so that the terminals SHa and SHb of the shunt resistor SH are, respectively, connected to the terminals 20a and 20b of the detecting means 20. When the accelerator pedal AC is released, operation is reversed and terminal SHa and 20b, is connected to terminal SHb is connected to terminal 20a. An absolute value circuit may be used in lieu of the polarity exchange circuit EX. The detected current is threshold detected and applied to the control circuit 300. The operation will be readily understood from the description in conjunction with FIG. 5.

Referring again to FIG. 6A, the collector output of the transistor 340 is selectively grounded through a switch 341 to a resistor 342. The switch 341 is ganged with the accelerator pedal AC, such that when the accelerator pedal AC is depressed, the transistor 340 output is connected to variable resistor 390, while, when not depressed, it is connected to resistor 341.

As described above, the object of the embodiments shown in FIGS. 5, 6A and 6B is to provide a proper regenerative braking by flowing a current into the field coil in dependence on the armature rotation speed, in a case where the accelerator pedal AC is released when the armature A is rotating. The first step to accomplish the object was described with reference to FIG. 5, which comprises a separate circuit for providing a current to the field coil F even if the accelerator pedal AC is released and the contact 140a is opened. FIG. 6A shows a circuit which controls the current flowing into the field coil F according to the rotation of the motor M by means of the abovementioned implementation. In general, if excitation of the field coil F is kept maximum, when the rotational speed of the motor M is high, too much regenerative braking results, whereas if excitation of the field coil F is kept to a minimum, when the rotational speed of the motor M is low, little or no regenerative braking results. Therefore, the current of the field coil F during the regeneration mode is preferably controlled to be small when the rotational speed of the motor M is high, and to be large when the rotational speed is low, whereby constant regenerative brake power can be obtained. Accordingly, as already described, for example when the rotation of the motor M is high, transistors 210 and 220 are preferably turned on.

When the accelerator pedal AC is released, resistance value of variable resistor 390 becomes minimal (or zero), and variable resistor 390 does not operate effectively in the regenerative mode. In the FIG. 6A embodiment, as previously described, when the accelerator pedal AC is released, the switch 341 is adapted to be changed over so that it is connected to resistor 342 which is chosen to be of such a value as to effect a small field coil current. As a result, in the FIG. 6A embodiment, in case where the accelerator pedal AC is released while the motor M is rotating and is in the regenerative mode, a current is applied to the field coil F, which current value is controlled according to the rotational speed of the motor M at that time.

Figure 7:
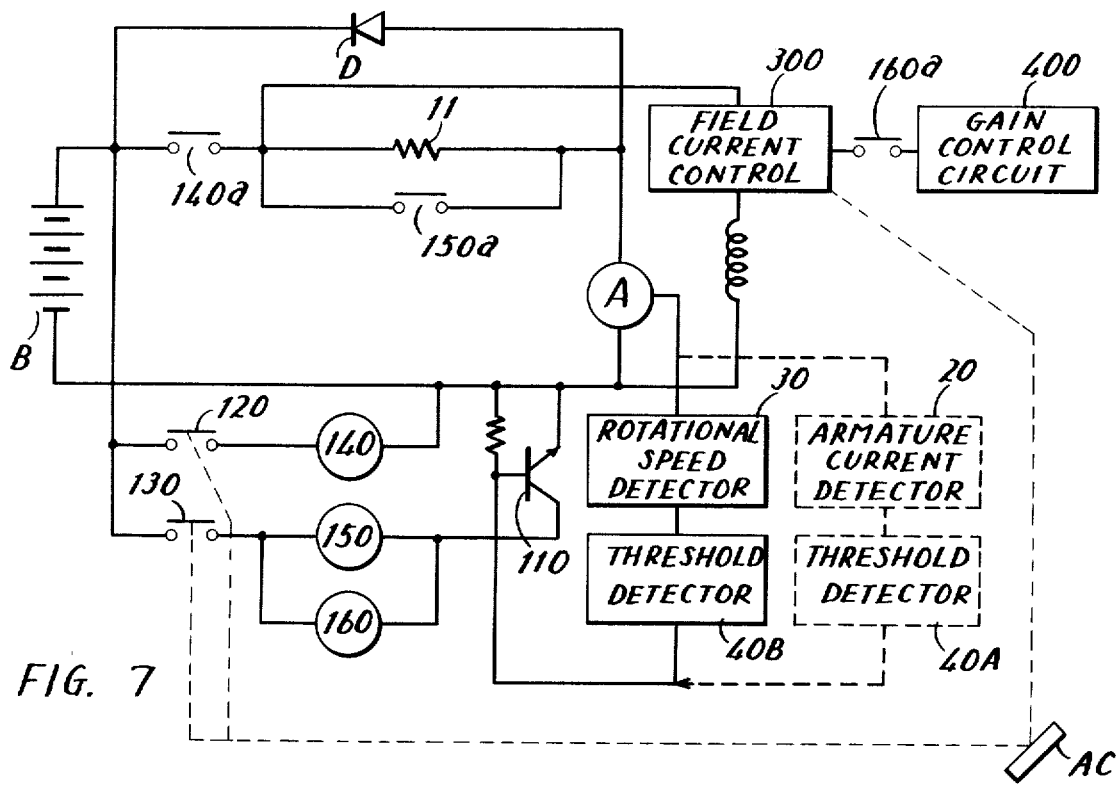
FIG. 7 shows a detailed electric circuit diagram of an embodiment of the present invention, with a gain control circuit for preventing a large surging current in the armature.
Figure 8:
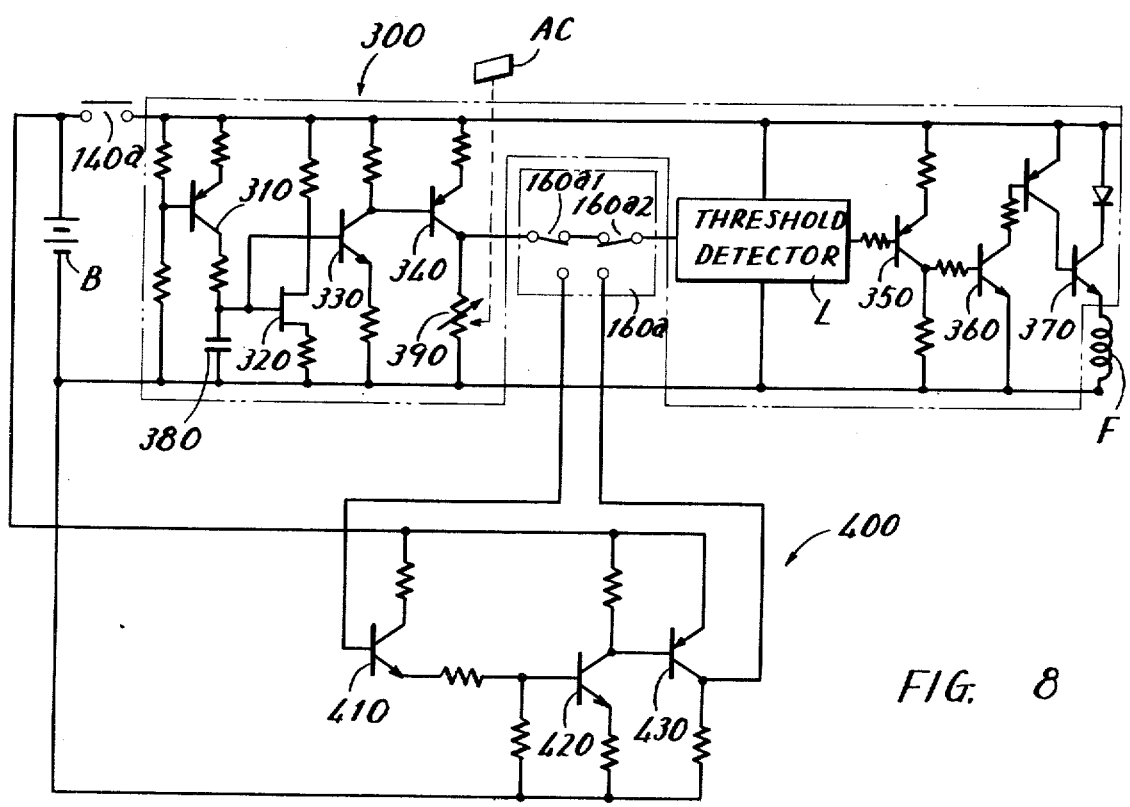
FIG. 8 shows a detailed circuit diagram of the field current control circuit with the gain control circuit as shown in FIG. 7.

FIGS. 7 and 8 show a schematic diagram of still a further embodiment of the present invention, which has been modified from the embodiment of FIGS. 5 and 6A. The same or like portions are designated by the same reference characters. An essential feature of this embodiment is that the armature voltage switching control is conditioned by a response to the threshold detected output of the armature rotational speed or armature current, on which switching occasion the armature voltage is forcibly increased, whereby the field coil current is controlled again to the initial value.

Since a major portion of the FIG. 7 diagram is similar to that of FIG. 1, only the characteristic feature thereof will be described specifically. The characteristic feature of the embodiment is that additional gain control circuit 400 is connected through a relay contact 160a to the control circuit 300. The relay contact 160a is of a normally opened type. The control circuit 400 makes control such that a large surge current is prevented from flowing into the armature at the time of resistor switching control of the armature terminal voltage. More detailed structure of the circuit 400 will be described with reference to FIG. 8, in which the circuit 400 as well as the circuit 300 is shown in more detail. The relay contact 160a is actuated by the relay 160 connected in parallel with the relay 150. Since the relay 160 is energized together with the relay 150, at the same time that the armature voltage switching control circuit is switch controlled to the second step, the control circuit 400 is connected to the control circuit 300.

Referring to FIG. 8 the control circuit 400 is inserted between the transistor 340 and the threshold detector L of the control circuit 300 through the relay switch 160a. The relay contact 160a comprises the relay contacts 160a1 and 160a2, and in the normal condition (condition as shown) directly connects the transistor 340 to the threshold detector L. When the relay 160 is energized, the relay contacts 160a1 and 160a2 are switched over so as to interpose the control circuit 400 therebetween.

The control circuit 400 comprises a voltage dividing circuit comprising three transistors 410, 420 and 430, as shown. As previously described, the control circuit 400 is connected to the circuit 300, when the accelerator pedal AC has been deeply depressed. Accordingly, the resistance value of the variable resistor 390 becomes so large that the output from the transistor 340 across the variable resistor 390 also becomes large. Therefore, the amplitude of the output wave form (saw tooth wave form) which passes from the transistor 340 to the threshold detector L becomes large. In this embodiment, however, the output from the transistor 340 of the large amplitude is made small by the transistor 410 in the control circuit 400 through proper amplification thereof by the transistors 420 and 430 and is then applied to the threshold detector L. As a result, the pulse width of the threshold detected output of a rectangular wave form or pulse form from the detector L becomes large. Therefore, the pulse width of the output of the transistor 370 becomes large, and accordingly, the current which flows into the field coil F becomes large. Therefore, it is understood that large current does not suddenly flow into the armature A.

In summary, at the time when the armature voltage is switched or resistor switching is done, the accelerator pedal AC has already been sufficiently depressed and the resistance value of the variable resistor 390 is large, so that the output of the transistor 340 is large, however, in the embodiment shown, at the same time as switching, the control circuit 400 is switched into the circuit 300 so that the amplitude of the output from the transistor 340 is reduce. Accordingly, the current which flows into the field coil F is increased, thereby preventing a large value surge current from flowing into the armature A. Alternatively of the control circuit 400, a resistor or a variable resistor may be used for performing the same purpose.

Figure 9:
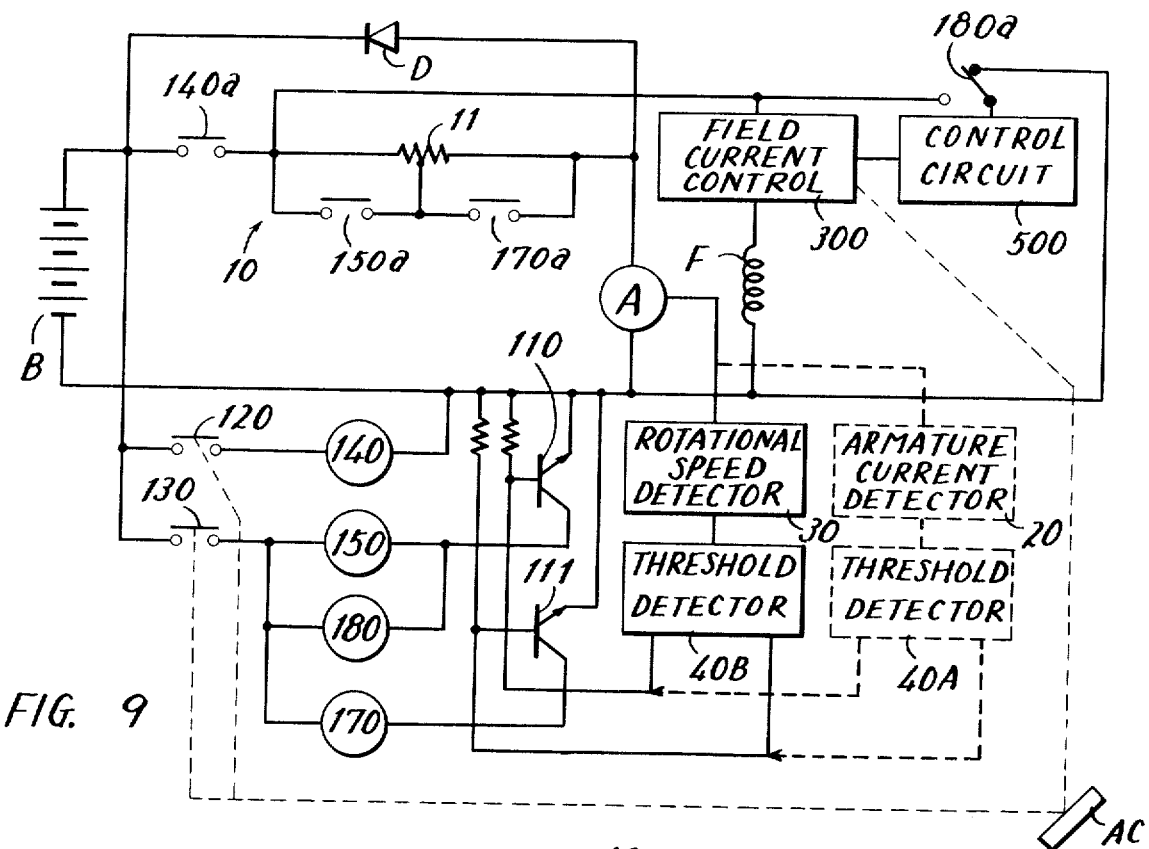
FIG. 9 shows a detailed electric circuit diagram of a further embodiment of the present invention, wherein resistor switching of the armature terminal voltage is controlled to reduce the transient.
Figure 10A:
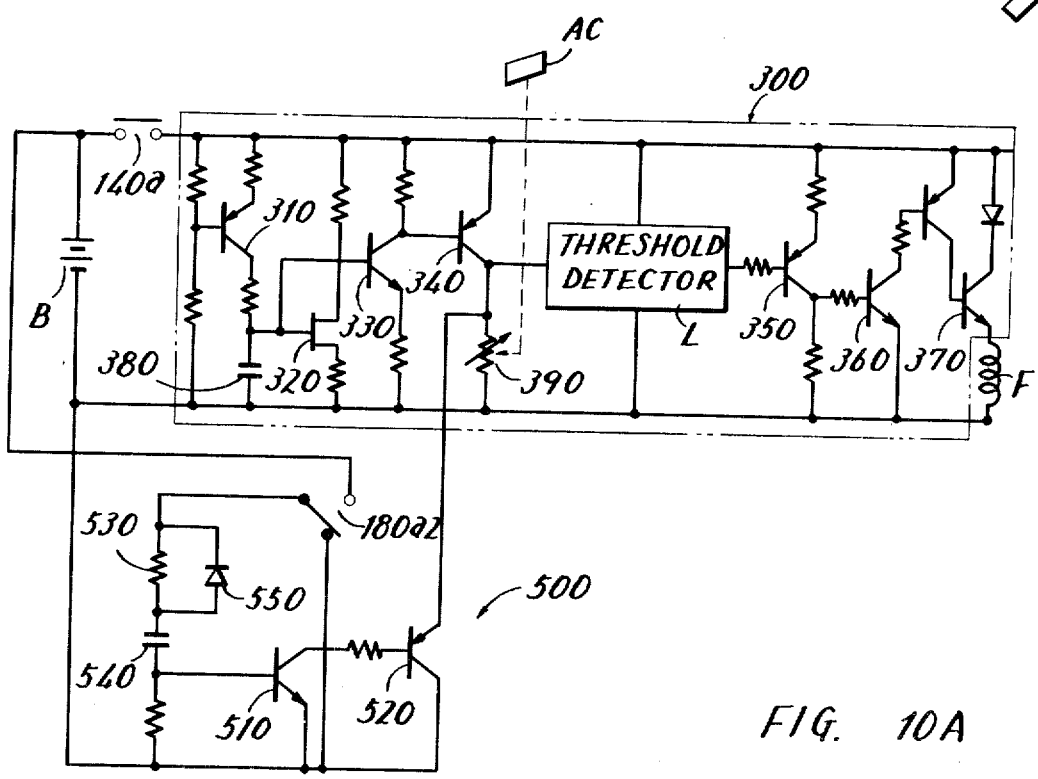
FIG. 10A shows a detailed circuit diagram of the control circuit shown in FIG. 9 for smoothing the tregent condition which occurs at the time of resistor switching of the armature terminal voltage.

FIGS. 9 and 10A show a detailed schematic diagram of a further embodiment of the present invention, which has been modified from the FIGS. 5 and 6 embodiment. Therefore, the same or like portions are designated by the same reference characters. An essential feature, of the embodiment shown, is that the resistor switching control of the armature terminal voltage is conditioned by a threshold detected output of the armature rotational speed or the armature current, and a transient state in the abovementioned resistor switching is made smooth.

Referring to FIG. 9, another control circuit 500 is connected through a relay contact 180a to the control circuit 300. The relay contact 180a is adapted to be normally turned to the grounded contact. Other portions are the same as those described with reference to the other figures. The control circuit 500 is intended to smooth the instantaneous abrupt decelerating or accelerating control situation at the resistor switching transient period, as to be more fully described.

The relay contacts 140a and 150a are actuated by the relays 140 and 150, respectively, which relays are connected to the battery B through the accelerator switches 120 and 130, respectively, which are individually ganged with the accelerator pedal AC. Upon slight depression of the accelerator pedal AC, the accelerator switch 120 is first closed, and then upon further depression of the pedal AC, the accelerator switch 130 is closed. Another end of relay 140 is connected to ground, so that when accelerator switch 120 is closed, relay 140 is energized and relay contact 140a is closed. However, it should be noted that another end of said relay 150 is connected to the collector of transistor 110, which is on/off controlled in response to an output from detector 40B which is obtained at a first threshold of a predetermined value of the armature rotational speed detected by the armature rotational speed detector 30 coupled to the motor M. As a result, it will be understood that a case where the rotational speed of the motor M is lower than predetermined speed, the transistor 110 is turned off, even though the accelerator switch 130 is closed. In such a situation, relay 150 is not energized and accordingly, in case relay contact 150a is not closed. In other words, in case where the rotational speed of the motor is low, the switching control of the armature terminal voltage is disabled even though the accelerator pedal AC is depressed abruptly. Generally where the rotational speed of the motor M has reached the predetermined speed and the resistor switching control is accomplished, an uncomfortable transient condition occurs which depends upon the degree of depression of the accelerator pedal AC, if an abrupt operation thereof is made. It is therefore an object of the embodiment shown to prevent such an uncomfortable condition from occurring, by smoothing the transient condition at the that time of the speed change. For the purpose, a relay 180 is connected in parallel with the relay 150 so that both relays 150 and 180 are energized at same time by the transistor 110. Another output from the detector 40B, obtained at a relatively lower second predetermined threshold value, is connected through transistor 111 to relay 170, which is connected in series with the accelerator switch 130 and in parallel with relays 150 and 180 and transistor 110.

In operation, when the rotational speed of the motor M has reached a value higher than that of the second threshold of relatively lower value, the relay 170 is energized and the relay contact 170a is closed, so that the first step of resistor switching control is achieved. In the next step, when the armature speed has reached a value higher than that of the first threshold of relatively higher value, the relay 150 is energized and the relay contact 150a is closed, so that the second step of resistor switching control is achieved. However, relay 180 is simultaneously energized and the relay contact 180a is closed, so that the control circuit 500 is activated. Thus, the control circuit 500 is operatively coupled to the control circuit 300 in response to energization of the relay 180. Alternatively, the control circuit 500 may be so designed as to be operatively coupled to the control circuit 300 in response to energization of the relay 170, or in response to the first step of resistor switching control, in which event the relay contact 180a should be actuated by the relay 170.

Referring to FIG. 9, operation thereof will be described in the following. At the time of start the accelerator pedal AC is depressed lightly, and correspondingly the accelerator switch 120 is closed, so that relay 140 is energized and relay contact 140a is closed. The path of battery B-resistor 11-armature A is formed thereby, and after a little while the rotational speed of the motor M attains a predetermined speed. Then the accelerator pedal AC is further depressed, and accordingly the accelerator switch 130 is also closed. At this time, since the motor M has already attained to the first threshold speed, the transistor 111 has been turned on, and thus the relay 170 has been energized, so that the first step change of the speed can be conducted smoothly. When the accelerator pedal AC is maintained in a depressed position and the motor M attains, a second threshold rotational speed, the transistor 110 is turned on so that the relays 150 and 180 are simultaneously energized to close the respective relay contacts 150a and 180a. As a result, the resistor switching control to the second step and activation of the control circuit 500 are effected. By activation of the control circuit 500, the control circuit 300 is controlled such that sensitivity thereof is changed so as to increase or decrease a current value fed to the field coil F. Even if the accelerator switch 130 is closed before the motor M has attained to the second threshold rotational speed, transistors 110 and 111 are both kept in an off condition, and relays 170 and 150 are not energized. Therefore, the resistor switching control to effect the first and second steps is disabled.

FIG. 10A shows a detailed schematic diagram of the control circuits 300 and 500. An output of the control circuit 500 is connected to an upper end of a variable resistor 390 of the control circuit 300. The control circuit 500 comprises cascade connected trnsistors 510 and 520, and a series connection comprising the relay contact 180a2, resistor 530 shunted by a diode 550, and capacitor 540. The emitter of the transistor 510 is grounded and the collector thereof is connected to the base of the transistor 520. The collector of the transistor 520 is grounded and the emitter thereof is connected to the upper end of the variable resistor 390.

As previously described, the control circuit 500 is made in an active condition by activation of the relay contact 180a2 to the power supply terminal side. Then, the capacitor 540 is charged through the series circuit of the resistor 530 and the capacitor 540. During a time period determined by the time constant for charging the capacitor in the series circuit, the transistor 510 is kept turned on and accordingly the transistor 520 is also kept turned on. Correspondingly, the voltage across the variable resistor 390 is divided by a voltage across the transistor 520. It is understood that by the voltage division a current value flowing through the field coil F is increased. In summary, at the same time as the second step resistor switching control, the control circuit 500 is made in an active state during a short time period as determined by the time constant of the resistor 530 and the capacitor 540, the voltage across the variable resistor 390 is divided to increase the current flowing through the field coil F. After that time period, conductivity of the transistor 520 decreases and the voltage division across the variable resistor 390 decreases. Thereafter, according to the degree of depression of the accelerator pedal AC the current flowing through the field coil F is changed.

From the foregoing description, it is shown that an abrupt change in the armature rotational speed is prevented when the resistor switching control switches to the second step and thus the transient state thereof is made smooth.

In the description of the embodiment mentioned above, the transistor 520 is directly connected to the upper terminal of the variable resistor 390. Preferably, however, the connection should be made through proper resistance, so that full voltage division to the variable resistor 390 is prevented and thus under certain condition instantaneous regenerative braking is avoided.

It is also pointed out that the coupling relation between the transistor 520 and the variable resistor 390 must be selected such that the field coil current flows corresponding to the rotational speed of the motor at the time when the relay 170 is energized.

Figure 10B:
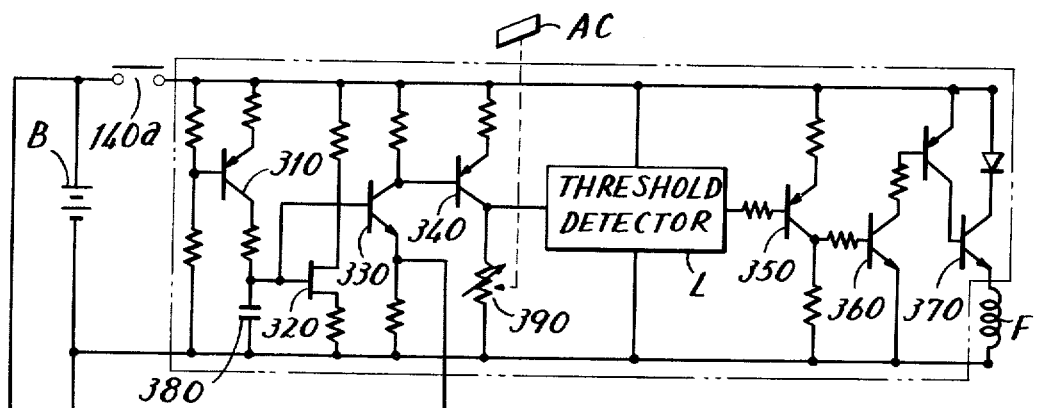
FIG. 10B shows an electric circuit diagram of another embodiment of the control circuit 500, which may be employed in place of the FIG. 10A embodiment.

FIG. 10B is similar to FIG. 10A and shows a schematic diagram of another embodiment of the control circuit 300, which may be employed in place of the FIG. 10A embodiment. Therefore, a major portion thereof is similar to that of FIG. 10A and the same or like portions are designated by the same reference characters. In the FIG. 10A circuit, a current of the field coil is increased during only a predetermined time period after the armature terminal voltage is control switched. However, in the FIG. 10B circuit, a current of the field coil is decreased. Therefore, the different portion in the FIG. 10B circuit is that the transistor 520 has been removed and the collector of the transistor 510 is connected through a resistor to the emitter of the transistor 330 of the control circuit 300. From the foregoing description, it will be readily understood that a current of the field coil F is decreased accordingly.

Figure 11:
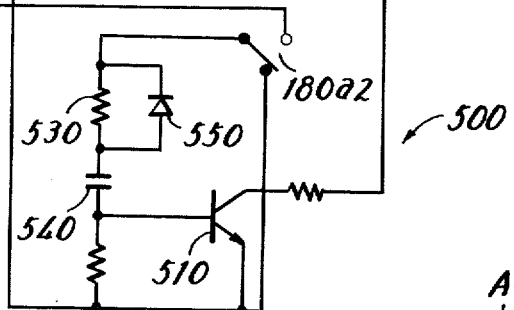
FIG. 11 shows in detail a schematic diagram of still a further embodiment of the present invention, which maintains a large field current until the motor reaches a predetermined speed.
Figure 11:
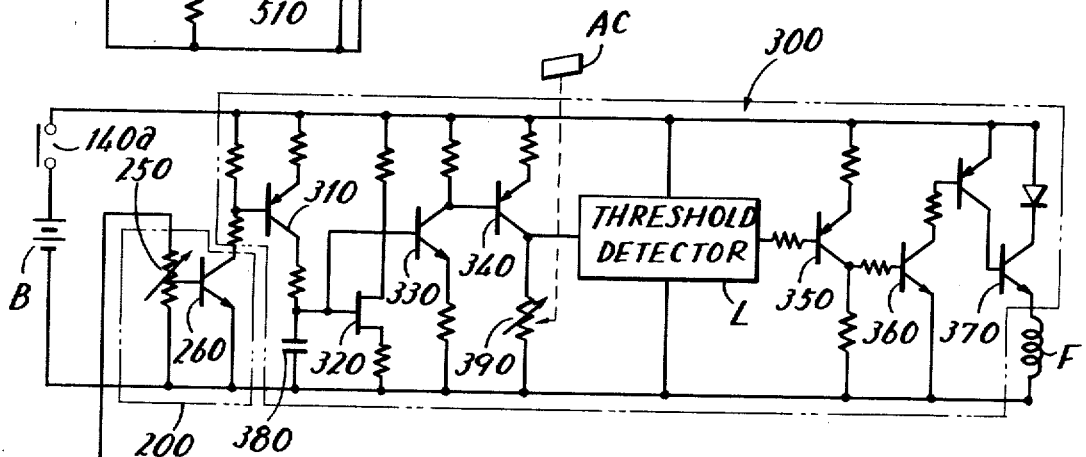

FIG. 11 shows in detail a schematic diagram of still a further embodiment of the present invention. In this embodiment the field current is made large until the motor M reaches a predetermined rotational speed. For this purpose, an additional control means 200 is inserted between the detector 40B and the base of the transistor 310 of the control circuit 300. The control means 200 comprises a variable resistor 250 which is connected to the output of the detector 40B and a transistor 260 a base of which is connected to a variable sliding terminal of the variable resistor 250. The collector of the transistor 260 is connected to the base of the transistor 310 of the control circuit 300 through a proper resistor.

In the embodiment shown, the transistor 310 is switching operative in response to the threshold detected output from the detector 40B. When the rotational speed of the motor is higher than the predetermined speed, the transistor 310 conducts and the control circuit 300 is enabled. When the rotational speed of the motor is lower than the predetermined rotational speed, the transistor 310 is turned off so that the control circuit 300 is disabled. Therefore, a current flowing from the battery B to the field coil F is not controlled and thus the maximum current therefrom is supplied to the field coil F. As a result, when the rotational speed of the motor M is lower than a given rotational speed, the maximum current is supplied to the field coil F and a large starting torque is obtained.

Figure 12A:
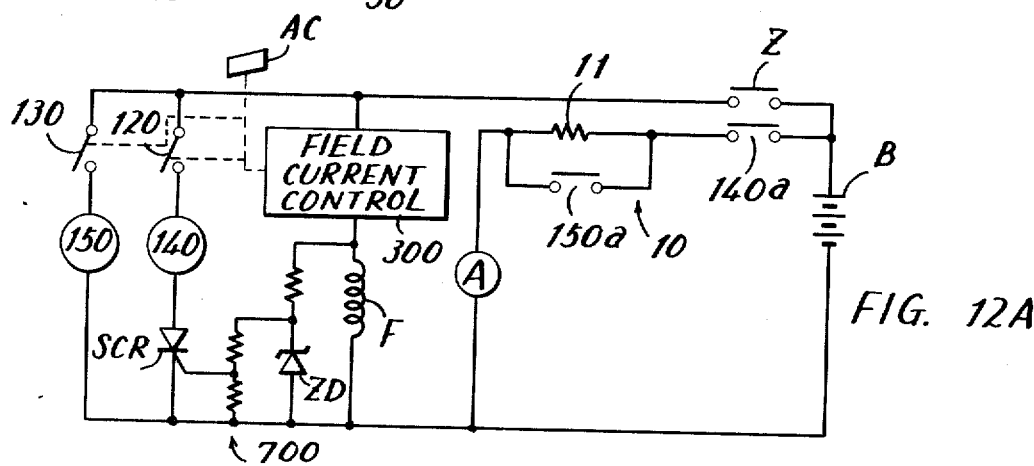
FIG. 12A is a schematic diagram of still another embodiment of the armature voltage switching control circuit of the present invention, wherein the armature terminal voltage cannot be applied until the field coil current reaches a predetermined level.

FIG. 12A is a schematic diagram of still another embodiment of the armature voltage switching control circuit of the present invention. Generally, in a shunt motor, when no current is flowing through the field coil, a short circuit state arises upon application of a voltage to the armature. Therefore, it is preferable that an armature voltage be applied to the armature, upon confirmation of the field current flowing through the field coil. This embodiment is intended to detect such a current flowing through the field coil permitting armature current to flow.

Referring to FIG. 12A in comparison with other similar figures discussed in the above, a switch Z is inserted between the battery B and the control circuit 300. The switch Z is adapted to be closed in response to insertion of a key into a key switch of an electric vehicle.

The relay contacts 140a and 150a are actuated by respective relays 140 and 150, which are respectively connected to accelerator switches 120 and 130. The accelerator switches 120 and 130 are closed individually according to the degree of depression of an accelerator pedal. It should be pointed out that another end of the relay 140 is connected through a thyristor SCR to ground, as shown. The gate electrode of the thyristor SCR is coupled through a proper potential divider comprising resistors and a Zenor diode. The potential divider is provided to shunt the opposite ends of the field coil F. Accordingly, the thyristor SCR is turned on when the voltage across the field coil F is higher than a given voltage. As a result, in the case where no current is flowing through the field coil F, the thyristor SCR is turned off. Even though the accelerator switch 120 is closed, relay 140 is not energized and accordingly the relay contact 140a is not closed, so that no power is supplied from the battery B to the armature A.

Referring to FIG. 12A a more detailed description as to operation follows. First, by inserting the key, the switch Z is closed and a power supply is applied to the control circuit 300. A current flows into the field coil F according thereto. As a result, the thyristor SCR is turned on. Upon depression of the accelerator pedal AC, the accelerator switches 120 and 130 are closed sequentially, and accordingly the relays 140 and 150 are energized sequentially. Correspondingly, the relay contacts 140a and 150a are closed sequentially and a power supply is applied to the armature A. In case where no current is flowing into the field coil F, even though the accelerator switches 120 and 130 have been closed upon depression of the accelerator AC, the thyristor SCR is turned off and the relay 140 is not energized. Accordingly, power is not applied to the armature A.

In order to detect a current flowing through the field coil F, a voltage across the field coil F is detected in the FIG. 12A embodiment. However, a current flowing into the field coil F can also be detected by a voltage drop across a resistor connected in series with the field coil F.

Figure 12B:
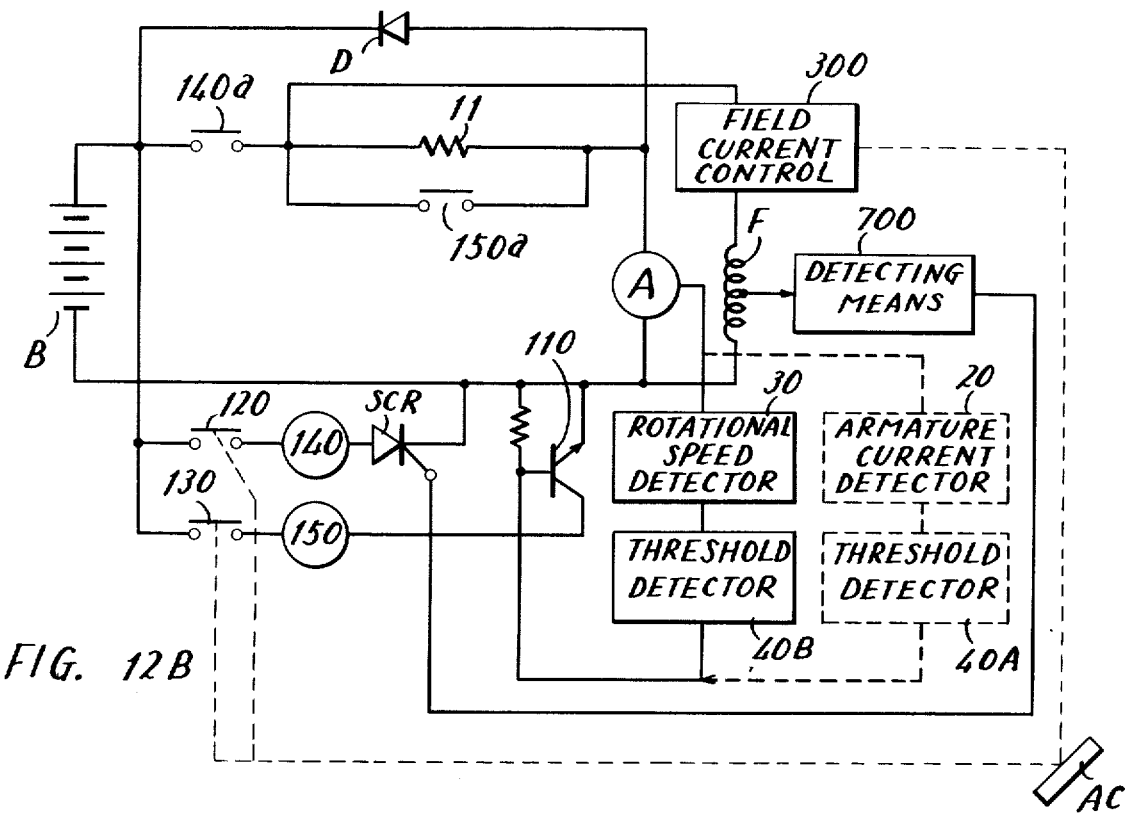
FIG. 12B shows a schematic diagram of a modification of the FIG. 12A embodiment.

FIG. 12B shows a schematic diagram of a modified embodiment as modified based on the FIG. 12A embodiment. Again, a major portion of this embodiment is the same as that of FIG. 12A and therefore the same portions are designated by the same reference characters. In the embodiment shown, resistor switching control of the armature terminal voltage to the second stage is conditioned by a threshold detected output of the armature rotational speed (or the armature current), by means of the relay 150 connected in series with the transistor 110, as more fully described in the FIG. 2 embodiment. In short, the transistor 110 is on/-off controlled by the output from the detector 40B, which threshold detects an output from the rotational speed detector 30 of the motor M at a predetermined threshold value. The threshold detected output is coupled to the base of the transistor 110. Therefore, in a case where the rotational speed of the motor is lower than the predetermined speed, the transistor 110 is turned off. Even if the accelerator switch 130 is closed, the relay 150 is not energized, and accordingly, the relay switch 150a is not closed. In other words, even if the accelerator pedal AC is depressed abruptly, in a case where the rotational speed of the motor M is low, the voltage switching control of the armature A is disabled.

Referring to FIG. 12B, more detailed description as to operation will be given in the following. At the start of the electric car, the accelerator pedal AC is depressed lightly, so that a current flows into the field coil F. Correspondingly, a means 700 which detects a current flowing into the field coil F provides a signal at a gate g of the thyristor SCR so that the thyristor SCR is turned on. Accordingly, if and when the accelerator switch 120 is closed, the relay 140 is energized and the relay contact 140a is closed. Therefore, a path of battery B-resistor 11-armature A is formed and, after a little while, the motor M reaches a predetermined rotational speed. Thereafter, upon further depression of the accelerator pedal AC, the accelerator switch 130 is also closed. At this time, since the motor M has already reached a predetermined rotational speed, the transistor 110 is turned on, and the relay 150 is energized, so that switching control of the armature voltage to the second step is also accomplished smoothly. Even if the accelerator switch 130 is closed before the motor M reaches a predetermined rotational speed, the transistor 110 is kept off, and the relay 150 is not energized, so that switching control of the armature voltage to the second step is disabled.

FIG. 13 shows a schematic diagram of still a further embodiment of the present invention. A characteristic feature of the embodiment shown is that the resistor switching control of the armature terminal voltage is allowed in response to both of the threshold detected output of the armature rotational speed and the threshold detected output of the armature current. The switching control is effected within a predetermined time and being reset within a predetermined time.

Figure 13B:
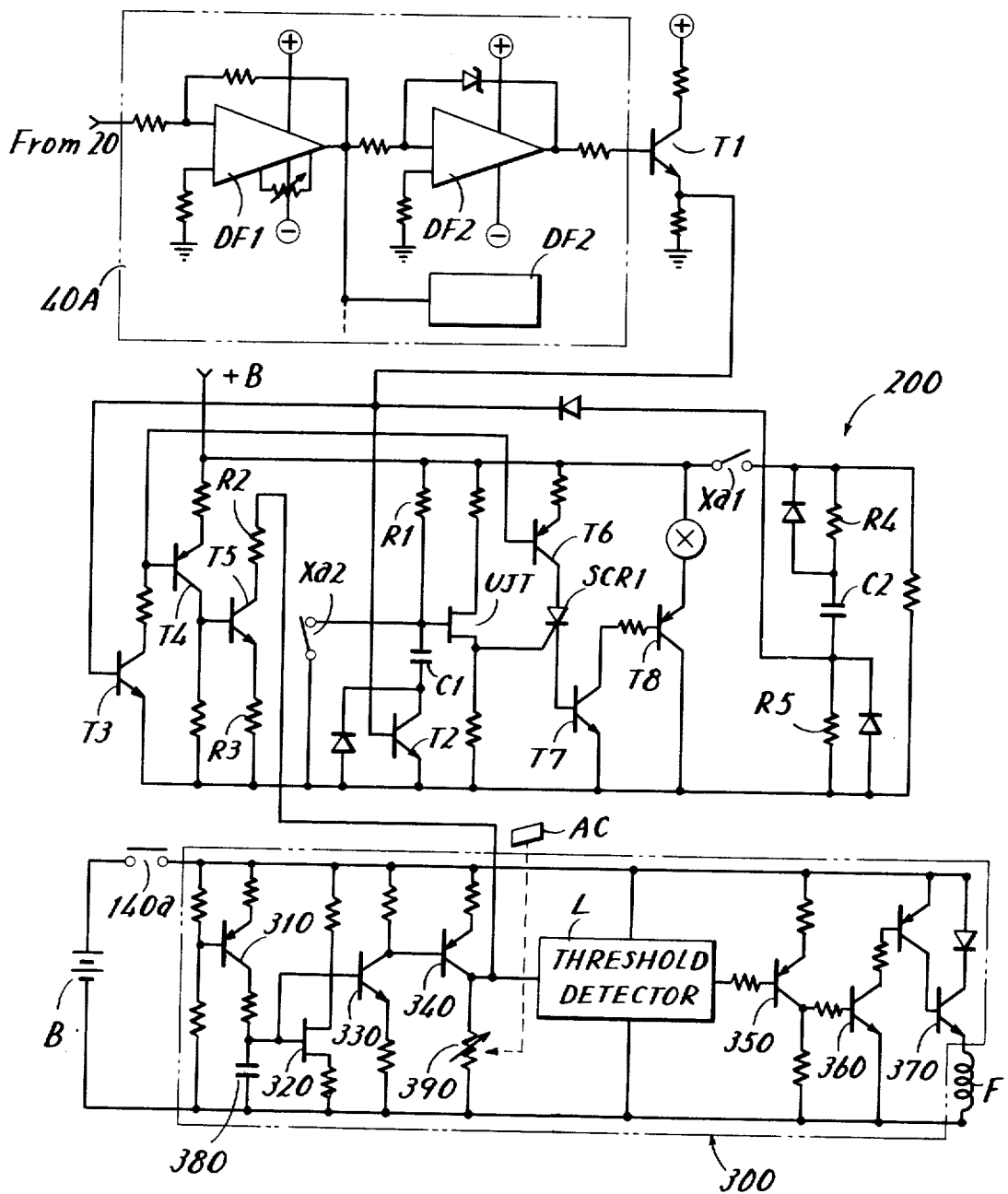
FIG 13B shows a detailed circuit diagram of the control circuitry which receives an output from the armature current detecting means as shown in FIG. 13A.
Figure 13A:
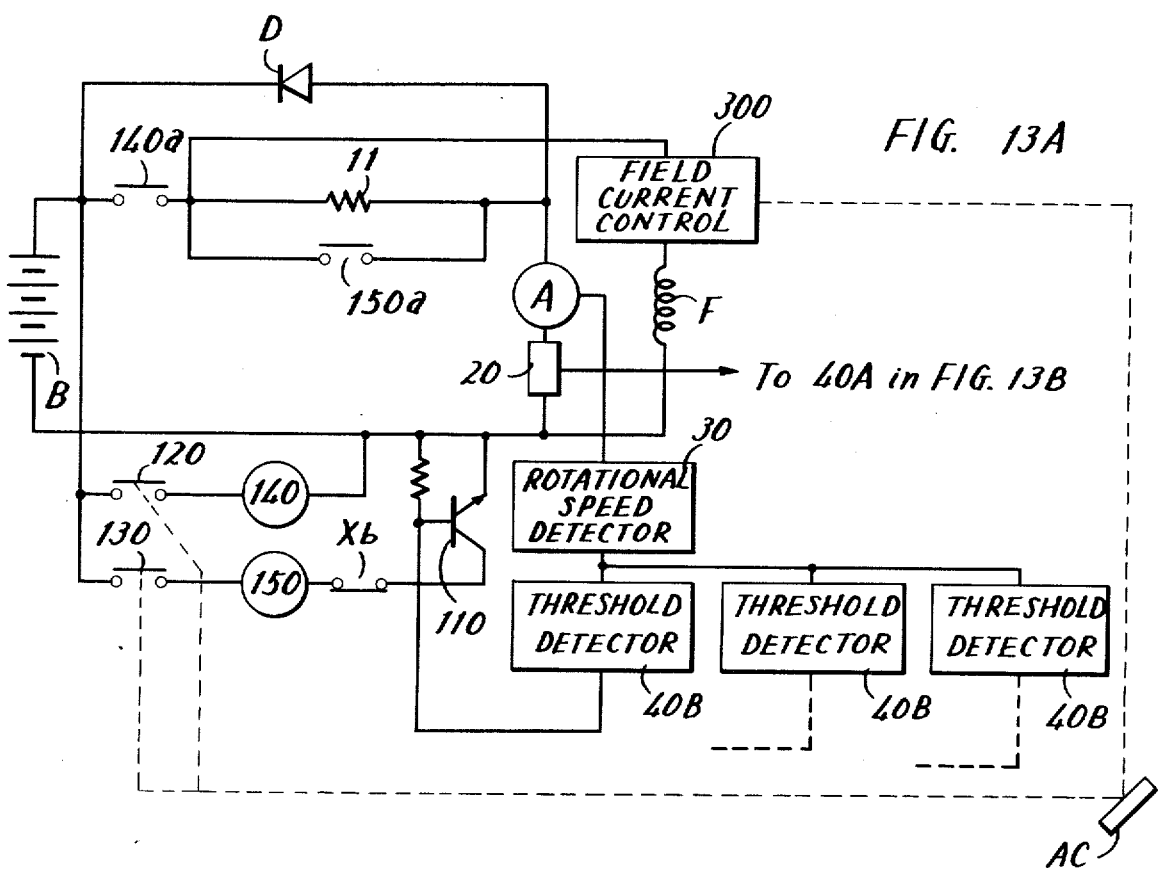
FIG. 13A shows a schematic diagram of still a further embodiment of the present invention wherein an armature current detecting means is connected in series with the armature.

The FIG. 13A illustration is substantially the same as the FIG. 1 illustration and major different portions are that an armature current detecting means 20 is connected in series with the armature A and that a relay contact X$b$ of normally closed type is connected between the relay 150 and the collector of the transistor 110.

FIG. 13B shows in some detail a threshold detector 40A which receives an output from the current detecting means 20 in FIG. 13A, an additional control circuit 200 and the control circuit 300, as described previously. The detector 40A comprises a differential amplifier DF1, which inverts and differentially amplifies the output from the detector 20, and a differential amplifier DF2, which inverts and threshold detects at a predetermined threshold an output from the amplifier DF1. A plurality of differential amplifiers DF2 of different threshold values may be provided in parallel, if required. The output from the amplifier DF2 is applied to the base of the transistor T1 so that it is on/off controlled. When the output is obtained from the amplifier DF2, the transistor T1 is turned on. The output obtained from the emitter of the transistor T1 is applied to the control circuit 200.

The output obtained from the transistor T1 when it is conductive makes the transistors T3, T4 and T5 of the circuit 200 turn on sequentially. The collector of the transistor T5 is connected to a variable resistor 390 of the control circuit 300 through the resistor R2 and the emitter of the transistor T5 is grounded through the resistor R3. Accordingly, in response to the output of the transistor T1 being conductive, the resistors R2 and R3 come to be connected in parallel with the accelerator variable resistor 390 of the control circuit 300. In other words, in response to the output of the transistor T1 being conductive, a variable range of the variable resistor 390 becomes small. It is understood, therefore, that as the current of the armature A increases, sensitivity of the accelerator variable resistor 390 goes down and the current of the field coil F is increased.

The output of the transistor T1 being conductive is applied to the base of the transistor T2 to turn it on. Conduction of the transistor T2 makes the capacitor C1 be charged through the resistor R1. A unijunction transistor UJT makes oscillation at a time constant determined by the capacitor C1 and the resistor R1. This oscillating output enables the thyristor SCR1. Accordingly, the output of the transistor T6, being conductive in response to the conduction of the transistor T3, makes transistors T7 and T8 sequentially turn on. Accordingly, the relay X is energized. Usually, a time period until the relay X is energized is determined by the time constant of the resistor R1 and the capacitor C1. Upon energization of the relay X, the normally opened contacts X$a$1 and X$a$2 are closed and the normally closed contact X$b$ (FIG. 13(A)) is opened. Therefore, even if the rotational speed of the motor M reaches a value higher than the predetermined speed and the transistor 110 (FIG. 13(A)) is in conductive condition, the relay 150 is not energized since the relay switch X$b$ is opened. Accordingly the switching control of the armature voltage to the second step is not effected. In an electric car employing a shunt motor in which the motor M is connected to an armature voltage switching control circuit 10 in series with a battery B, the armature current and the armature rotational speed are in almost inversely proportional relationship to each other, with respect to a given load on the motor M in a dynamic characteristic thereof. Therefore, as the armature rotational speed increases; the armature current goes down. Accordingly, by properly selecting the threshold levels of the detectors 40A and 40B, more precise switching control of the armature voltage is possible, while a motor control system can be protected sufficiently.

When the accelerator pedal AC is depressed, the armature current rapidly increases, but the armature current decreases abruptly as soon as the armature reaches a predetermined rotational speed. If the period for decreasing the armature current is short, the relay X is switch controlled often. Accordingly, in order to eliminate such a condition, a means is provided in the second control means 200, which keeps the relay X energized during a predetermined time period. Namely, upon closing of the relay contact X$a$1, the capacitor C2 is charged through the resistor R4 and the voltage across the resistors R5 connected in series with the capacitor C2 enables the transistors T2 and T3 and accordingly a transistor T6 into a conductive state. Therefore, when an output is not obtained from the detector 40A and the transistor T1 is in a cut-off condition, the relay X is kept energized for a time period determined by the time constant of the resistor R4 and the capacitor C2. The relay contact X$a$2 is provided for the purpose of discharging the capacitor C1 each time the relay X is energized.

With simultaneous reference to FIGS. 13A and 13B, operation of the embodiment will be described in the following. Let it be assumed that the accelerator pedal AC is depressed abruptly and deeply at the time the car is started. Correspondingly, the accelerator switches 120 and 130 are both closed. The relay 140 is energized in response to the closing of the switch 120, and the relay contact 140$a$ is closed. On the other hand, the relay 150 is not energized since the motor M has not attained to the predetermined rotational speed and the transistor 110 is cut off. Accordingly, the relay contact 150$a$ is not closed despite the depression of the accelerator pedal AC. When the motor M has reached the predetermined rotational speed, the transistor 110 is turned on. While the armature current is large, the motor will suffer a transient by switching control of the armature voltage and be adversely affected thereby. In order to avoid this, the transistor T1 is turned on, while the armature current is large, and the relay X in the control means 200 is energized so that the normally closed contact X$b$ is opened. Accordingly, despite the conductive state of the transistor 110, the relay 150 is not energized through opening of the contact X$b$. Therefore, the switching control of the armature voltage is disabled.

The control circuit 200 is operated in response to the change of the armature current. Therefore, every time the change of the armature current is abrupt, the switching of the relay X will be effected. It should be noted, however, that in the present embodiment shown, the relay X is energized after a delay time determined by the time constant of the resistor R1 and the capacitor C1 upon detection of the armature current, and even though the armature current has become lower than a predetermined value, the relay X is kept energized for a while and is deenergized after a period determined by the resistor R4 and the capacitor C2.

In the control device of the present embodiment, switching control of the armature terminal voltage is effected and conditioned by the threshold value of the armature rotational speed, while the field coil current is controlled both in response to a degree of depression of the accelerator pedal, and/or the armature current. As a result, of the present invention, an electric car with a shunt motor can be controlled to reduce the uncomfortable surges that normally result during speed changes. Steering stability at the start of the electric car is also improved, while adverse affects on the motor caused by such situations is removed.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A control device for an electric vehicle comprising:
   an electrical power source;
   a DC shunt or compound motor for driving said electric vehicle, said motor comprising an armature and a shunt field coil being connected so as to be energized by said electrical power source;
   means for adjusting the rotational speed of said motor, wherein said means for adjusting has a range of positions and is continuously adjustable from a start position to positions throughout its range;
   switching control means responsive to said speed adjusting means for selectively applying values of armature terminal voltage to said armature; and
   field coil current control means responsive to said speed adjusting means throughout said range for continuously controlling the current flowing through said shunt field coil, whereby the rotational speed of said motor is controlled to a value determined by the applied armature terminal voltage selected by said switching control means and the current flowing through said shunt field coil continuously controlled by said field coil current control means.

2. A control device for an electric vehicle in accordance with claim 1, in which said switching control means comprises:
   a switch controllable in response to said speed adjusting means;
   a relay connected to be energized in response to control of said switch; and
   a resistor connected between said armature and said power source, said resistor being shunted by a relay contact of said relay.

3. A control device for an electric vehicle in accordance with claim 1, in which said field coil current control means comprises:
   means for on/off controlling a current flowing through said field coil; and
   means responsive to adjustment of said speed adjusting means for controlling continuously a conduction phase of said current flowing through said field coil.

4. A control device for an electric vehicle in accordance with claim 3, in which said conduction phase control means comprises:
   means for generating a saw tooth wave signal;
   means for threshold detecting said saw tooth wave signal; and
   means responsive to said speed adjusting means for changing the amplitude of said saw tooth wave signal being detected by said threshold detecting means.

5. A control device for an electric vehicle in accordance with claim 1, which further comprises:
   means for providing an electrical signal corresponding to the rotational speed of said motor.

6. A control device for an electric vehicle in accordance with claim 5, in which said means for providing a rotational speed signal comprises means operatively coupled to said motor for detecting the rotational speed of said motor.

7. A control device for an electric vehicle in accordance with claim 5, in which said means for providing a rotational speed signal comprises means for detecting the current flowing through said armature.

8. A control device for an electric vehicle in accordance with claim 5, which further comprises
   means responsive to said switching control means for controlling said field coil current control means to adjust the field current, thereby preventing a sudden change in armature current at the time said selected armature terminal voltage is changed to another selected value.

9. A control device for an electric vehicle in accordance with claim 5, which further comprises
   means responsive to said rotational speed signal for controlling said field coil current control means causing said field current to be a maximum when said rotational speed of said rotational speed of said motor is below a predetermined value, whereby a large starting torque is obtained.

10. A control device for an electric vehicle in accordance with claim 5, which further comprises
    means for detecting a current flowing through said shunt field coil, and
    means responsive to said field coil current detecting means for enabling said switching control means.

11. A control device for an electric vehicle in accordance with claim 1, which further comprises:
    means operatively coupled to said motor for detecting the rotational speed of said motor, and providing a rotational speed signal;
    means for detecting the current flowing through said armature, providing an armature current signal;
    means responsive to said rotational speed signal for conditioning the response of said switching control means to said speed adjusting means upon said rotational speed signal reaching at least a predetermined value; and
    means responsive to said armature current signal for conditioning the sensitivity of response of said field current control means to said speed adjusting means upon said armature current reaching a threshold value.

12. A control device for an electric vehicle in accordance with claim 11, wherein said
    means responsive to said armature current signal includes means for disabling said switching control means for at least a given time period when said armature current exceeds a threshold value.

13. A control device for an electric vehicle in accordance with claim 12, wherein said means responsive to said armature current signal includes means for delaying said disabling of said switching control means for a predetermined period of time when said armature current exeeds a threshold value.

14. A control device for an electric vehicle in accordance with claim 1, in which said switching control means comprises:
a resistor connected between said armature and said electrical power source, and
a switching device connected in parallel with said resistor, said switching device being controlled with respect to the position of said speed adjusting means.

15. A control device for an electric vehicle comprising:
an electrical power source;
a DC shunt or compound motor for driving said electric vehicle, said motor comprising an armature and a shunt field coil being connected so as to be energized by said electrical power source;
means for adjusting the rotational speed of said motor, wherein said means for adjusting has a range of positions and is continuously adjustable from a start position to positions throughout its range;
switching control means responsive to said speed adjusting means for selectively applying values of armature terminal voltage to said armature; and
field coil current control means responsive to said speed adjusting means throughout said range for continuously controlling the current flowing through said shunt field coil;
means for providing an electrical signal corresponding to the rotational speed of said motor; and
means responsive to said rotational speed signal for conditioning the response of said switching control means to said speed adjusting means upon said rotational speed signal reaching at least a threshold value; whereby the rotational speed of said motor is controlled to a value determined by the applied armature terminal voltage selected by said switching control means and the current flowing through said shunt field coil continuously controlled by said field coil current control means.

16. A control device for an electric vehicle in accordance with claim 15, in which said conditioning means comprises:
a threshold detecting means responsive to said rotational speed signal for threshold detecting said speed signal at a predetermined threshold value and providing an output thereof; and
a switching device responsive to said threshold detected output from said threshold detecting means for allowing said switching control means to respond to said speed adjusting means.

17. A control device for an electric vehicle in accordance with claim 15, which further comprises
means responsive to said rotational speed signal for conditioning the response of said field coil current control means to said speed adjusting means upon said rotational speed signal reaching at least a predetermined value.

18. A control device for an electric vehicle in accordance with claim 15 wherein said field current control means includes:
variable impedance means responsive to said speed adjusting means and said rotational speed signal, whereby said rotational speed signal changes the impedance of said variable impedance means to thereby control the sensitivity of response to said field coil current control means to said speed adjusting means.

19. A control device for an electric vehicle comprising:
an electrical power source;
a DC shunt or compound motor for driving said electric vehicle, said motor comprising an armature and a shunt field coil being connected so as to be energized by said electrical power source;
means for adjusting the rotational speed of said motor, wherein said means for adjusting has a range of positions and is continuously adjustable from a start position to positions throughout its range;
switching control means responsive to said speed adjusting means for selectively applying values of armature terminal voltage to said armature;
field coil current control means responsive to said speed adjusting means throughout said range for continuously controlling the current flowing through said shunt field coil;
means for providing an electrical signal corresponding to the rotational speed of said motor; and
means responsive to said rotational speed signal for conditioning the response of said field coil current control means to said speed adjusting means upon said rotational speed signal reaching at least a threshold value; whereby the rotational speed of said motor is controlled to a value determined by the applied armature terminal voltage selected by said switching control means and the current flowing through said shunt field coil continuously controlled by said field coil current control means.

20. A control device for an electric vehicle in accordance with claim 19, in which said conditioning means comprises:
threshold detecting means responsive to said rotational speed signal for threshold detecting said speed signal at a predetermined threshold value; and
means responsive to said output from said threshold detecting means for controlling the sensitivity of the response of said field coil current control means to said speed adjusting means.

21. A control device for an electric vehicle comprising:
power electrical powe source;
a DC shunt or compound motor for driving said electric vehicle, said motor comprising an armature and a shunt field coil being connected so as to be energized by said electrical power source;
means for adjusting the rotational speed of said motor, wherein said means for adjusting has a range of positions and is continuously adjustable from a start position to positions throughout its range;
switching control means responsive to said speed adjusting means for selectively applying values of armature terminal voltage to said armature;
field coil current control means responsive to said speed adjusting means throughout said range for continuously controlling the current flowing through said shunt field coil;
means for providing an electrical signal corresponding to the rotational speed of said motor; and means responsive to said rotational speed signal for maintaining a current in said shunt field coil when said speed adjusting means is adjusted to said start position and the speed of said motor is relatively high; whereby the rotational speed of said motor is controlled to a value determined by the applied armature terminal voltage selected by said switching control means and the current flowing through said shunt field coil continuously controlled by said field coil current control means.

22. A control device for an electric vehicle in accordance with claim 21, in which said maintaining means comprises means responsive to said rotational speed signal for keeping said field coil current control means energized for maintaining said current in said shunt field coil when said speed adjusting means is adjusted to said start position and the speed of said motor is relatively high.

* * * * *